US009916456B2

(12) United States Patent
O'Hare et al.

(10) Patent No.: US 9,916,456 B2
(45) Date of Patent: Mar. 13, 2018

(54) SYSTEMS AND METHODS FOR SECURING AND RESTORING VIRTUAL MACHINES

(71) Applicant: Security First Corp., Rancho Santa Margarita, CA (US)

(72) Inventors: Mark S. O'Hare, Coto de Caza, CA (US); Rick L. Orsini, Flower Mound, TX (US)

(73) Assignee: Security First Corp., Rancho Santa Margarita, CA (US)

( * ) Notice: Subject to any disclaimer, the term of this patent is extended or adjusted under 35 U.S.C. 154(b) by 218 days.

(21) Appl. No.: 13/831,164

(22) Filed: Mar. 14, 2013

(65) Prior Publication Data

US 2013/0268931 A1    Oct. 10, 2013

Related U.S. Application Data

(60) Provisional application No. 61/621,268, filed on Apr. 6, 2012.

(51) Int. Cl.
| | | |
|---|---|---|
| *G06F 9/455* | (2006.01) | |
| *G06F 21/60* | (2013.01) | |
| *G06F 9/48* | (2006.01) | |
| *G06F 21/31* | (2013.01) | |
| *G06F 21/62* | (2013.01) | |

(52) U.S. Cl.
CPC ............ *G06F 21/602* (2013.01); *G06F 9/455* (2013.01); *G06F 9/485* (2013.01); *G06F 21/31* (2013.01); *G06F 21/606* (2013.01); *G06F 21/6209* (2013.01); *G06F 21/629* (2013.01); *G06F 2221/2107* (2013.01); *G06F 2221/2111* (2013.01)

(58) Field of Classification Search
None
See application file for complete search history.

(56) References Cited

U.S. PATENT DOCUMENTS

| | | |
|---|---|---|
| 5,485,474 A | 1/1996 | Rabin |
| 6,711,594 B2 | 3/2004 | Yano et al. |

(Continued)

FOREIGN PATENT DOCUMENTS

| | | |
|---|---|---|
| CN | 101409714 | 4/2009 |
| GB | 2463078 | 3/2010 |

(Continued)

OTHER PUBLICATIONS

"Hide Sensitive Folders in Plain Sight With Disguise Folders", Aseem Kishore File, Sep. 27, 2011, retrieved from http://helpdeskgeek.com/windows-7/hide-sensitive-folders-in-plain-sight-with-disguise-folders/.*

(Continued)

*Primary Examiner* — Gregory A Kessler
(74) *Attorney, Agent, or Firm* — Haley Guiliano LLP

(57) ABSTRACT

Systems and methods are provided for securing a virtual machine by causing a plurality of shares of virtual machine files to be separately stored in response to a stop command. Systems and methods are also provided for restoring a data set with a cryptographic restoration application in response to a series of user inputs received when no visual indicator of the cryptographic restoration algorithm is displayed, and for restoring a data set with data shares received from another computer device in response to detecting a communication link with the device.

54 Claims, 24 Drawing Sheets

(56) References Cited

U.S. PATENT DOCUMENTS

| | | | |
|---|---|---|---|
| 6,957,349 B1 | 10/2005 | Yasukura | |
| 7,111,303 B2 | 9/2006 | MacChiano et al. | |
| 7,206,250 B2 | 4/2007 | Groux | |
| 7,222,062 B2 | 5/2007 | Goud et al. | |
| 7,228,337 B1 | 6/2007 | Bornstein et al. | |
| 7,356,818 B2 | 4/2008 | Carollo et al. | |
| 7,391,865 B2 | 6/2008 | Orsini et al. | |
| 7,392,403 B1 | 6/2008 | Munetoh | |
| 7,506,170 B2 | 3/2009 | Finnegan | |
| 7,573,851 B2 | 8/2009 | Xing et al. | |
| 7,680,643 B2* | 3/2010 | Ragnunath et al. | 703/20 |
| 7,721,150 B2 | 5/2010 | Belyakov et al. | |
| 7,743,275 B1 | 6/2010 | Tormasov et al. | |
| 7,797,699 B2 | 9/2010 | Kagi et al. | |
| 7,827,383 B2 | 11/2010 | Spracklen et al. | |
| 7,831,995 B2 | 11/2010 | Futoransky et al. | |
| 7,900,002 B2 | 3/2011 | Lyon | |
| 8,009,830 B2 | 8/2011 | Orsini et al. | |
| 8,032,741 B2 | 10/2011 | Smith | |
| 8,068,613 B2 | 11/2011 | Scaralata | |
| 8,108,668 B2 | 1/2012 | Rozas | |
| 8,126,806 B1 | 2/2012 | Dimartino et al. | |
| 8,135,134 B2 | 3/2012 | Orsini et al. | |
| 8,220,029 B2 | 7/2012 | Zhang et al. | |
| 8,261,265 B2 | 9/2012 | Chen et al. | |
| 8,266,438 B2 | 9/2012 | Orsini et al. | |
| 8,352,717 B2 | 1/2013 | Campbell et al. | |
| 8,397,242 B1 | 3/2013 | Conover | |
| 8,473,756 B2 | 6/2013 | Orsini et al. | |
| 8,682,862 B2 | 3/2014 | Rosikiewicz et al. | |
| 8,713,300 B2 | 4/2014 | Clifford et al. | |
| 8,719,594 B2 | 5/2014 | Dodgson et al. | |
| 8,725,973 B2 | 5/2014 | Prahlad et al. | |
| 8,826,013 B1 | 9/2014 | Kodukula et al. | |
| 8,832,039 B1 | 9/2014 | Sorenson, III et al. | |
| 8,850,512 B2 | 9/2014 | Price et al. | |
| 2003/0023958 A1 | 1/2003 | Patel et al. | |
| 2003/0074535 A1* | 4/2003 | Owhadi | 711/162 |
| 2004/0267866 A1 | 12/2004 | Carollo et al. | |
| 2005/0111657 A1 | 5/2005 | Lee et al. | |
| 2005/0268336 A1 | 12/2005 | Finnegan | |
| 2006/0004698 A1 | 1/2006 | Pyhalammi et al. | |
| 2006/0130060 A1 | 6/2006 | Anderson et al. | |
| 2006/0143688 A1 | 6/2006 | Futoransky et al. | |
| 2006/0177061 A1 | 8/2006 | Orsini et al. | |
| 2007/0157025 A1 | 7/2007 | Sastry et al. | |
| 2007/0160198 A1 | 7/2007 | Orsini et al. | |
| 2008/0043614 A1 | 2/2008 | Soliman | |
| 2008/0082670 A1 | 4/2008 | Gounares et al. | |
| 2008/0126614 A1 | 5/2008 | Ooi et al. | |
| 2008/0183992 A1 | 7/2008 | Martin et al. | |
| 2009/0055641 A1 | 2/2009 | Smith | |
| 2009/0222558 A1 | 9/2009 | Xu et al. | |
| 2009/0271620 A1* | 10/2009 | Sudhakar | 713/164 |
| 2009/0282262 A1 | 11/2009 | Nonoyama et al. | |
| 2009/0288167 A1 | 11/2009 | Freericks et al. | |
| 2010/0005028 A1 | 1/2010 | Hartley et al. | |
| 2010/0037096 A1* | 2/2010 | Bum | G06F 11/1438 714/19 |
| 2010/0107252 A1 | 4/2010 | Mertoguno | |
| 2010/0125473 A1 | 5/2010 | Tung et al. | |
| 2010/0223613 A1 | 9/2010 | Schneider | |
| 2010/0235833 A1* | 9/2010 | Huang | G06F 21/575 718/1 |
| 2010/0262797 A1* | 10/2010 | Rosikiewicz et al. | 711/162 |
| 2010/0299313 A1 | 11/2010 | Orsini et al. | |
| 2010/0318812 A1 | 12/2010 | Auradkar et al. | |
| 2011/0016466 A1* | 1/2011 | Liu et al. | 718/1 |
| 2011/0029652 A1 | 2/2011 | Chhuor et al. | |
| 2011/0093958 A1 | 4/2011 | Devictor | |
| 2011/0138314 A1 | 6/2011 | Mir et al. | |
| 2011/0225417 A1 | 9/2011 | Maharajh et al. | |
| 2011/0246767 A1 | 10/2011 | Chaturvedi et al. | |
| 2011/0246786 A1 | 10/2011 | Laor et al. | |
| 2011/0271279 A1 | 11/2011 | Pate | |
| 2012/0117566 A1 | 5/2012 | Maeda et al. | |
| 2012/0159197 A1 | 6/2012 | Orsini et al. | |
| 2012/0179916 A1 | 7/2012 | Staker et al. | |
| 2012/0204030 A1 | 8/2012 | Nossik et al. | |
| 2013/0198370 A1 | 8/2013 | Aguchi et al. | |
| 2013/0268774 A1 | 10/2013 | O'Hare et al. | |
| 2014/0162598 A1 | 6/2014 | Villa-real | |

FOREIGN PATENT DOCUMENTS

| | | |
|---|---|---|
| JP | 2000-174675 | 6/2000 |
| JP | 2005/250866 | 9/2005 |
| JP | 2008/098894 | 4/2008 |
| WO | WO 2006/004769 | 1/2006 |
| WO | WO 2006/047694 | 5/2006 |
| WO | WO 2009/025220 | 8/2008 |
| WO | WO 2009/020143 | 2/2009 |
| WO | WO 2010/135412 | 11/2010 |

OTHER PUBLICATIONS

International Search Report and Written Opinion datedMay 4, 2012 in International Application No. PCT/US2011/048283 (21 pages).

Kangho et al, "Interdomain Socket Communications Supporting High Performance and Full Binary Compatibility on Xen", 2008 ACM Sigplan/Sigops International conference on virtual Execution Environments (VEE '08). Mar. 5-7, 2008, Seattle, WA, ACM, US, Jan. 1, 2008, pp. 11-20, XP007911410, ISBN: 978-1-59593-796-4.

Wylie J. J. et al. "Survivable Information Storage Systems" Computer, IEEE Service Center Los Alamitos, CA, Us, vol. 33, No. 8, Aug. 1, 2000, pp. 61-67, XP000987571, ISSN: 0018-9162, DOI: 10.110-9/2.86369 abstract. Sections: "PASIS system components and operation" and "General Threshold Schemes".

International Search Report and Written Opinion dated Sep. 9, 2013 in International Application No. PCT/US2013/031597 (29 pages).

Shamir, "How to Share a Secret," Communications of the Association for Computing Machinery, ACM, New York, NY, US, vol. 22, No. 11, Nov. 1, 1979, pp. 1-4, XP002241399; ISSN: 0001-0782.

"BizCITY, Cloud Computing Scheme That Shapes the Next-Generation BizCITY," NTT Technical Review, Japan, The Telecommunications Association, Feb. 1, 2009, vol. 21, No. 2, pp. 32-35. (English language translation attached.)

International Search Report and Written Opinion dated Dec. 14, 2010 in International Application No. PCT/US2010/035377.

Mitchell, "Making Serial Number Based Authentication Robust Against Loss of State," Operating Systems Review, vol. 34, No. 3, pp. 56-59, Nov. 24, 1999.

Nozawa, "Power Line Communication Rapidly Gaining Practicality, No Obstacle for 3 Mega Service, Further Speed-Up Due to Easing of Regulations," ("kyuusokuni genjitsusei wo obiru denryokusentuushin 3 megano sabisu ni shougainashi kiseikanwa de saranaru kousokukamo"), Nikkei Communications, Japan, Nikkei Business Publications, Feb. 5, 2001, No. 335, pp. 65-67. (Concise explanation included in IDS letter.).

Toshinori Tanaka, "Multimedia Network Technology 12 Mobile Multimedia no doukou to tenkai," Japan, Kyoritsu Publishing, Dec. 1, 1998, vol. 30, No. 12, p. 87-95.

Weiss, Aaron, "Computing in the Clouds," Dec. 12, 2005, pp. 17-25.

* cited by examiner

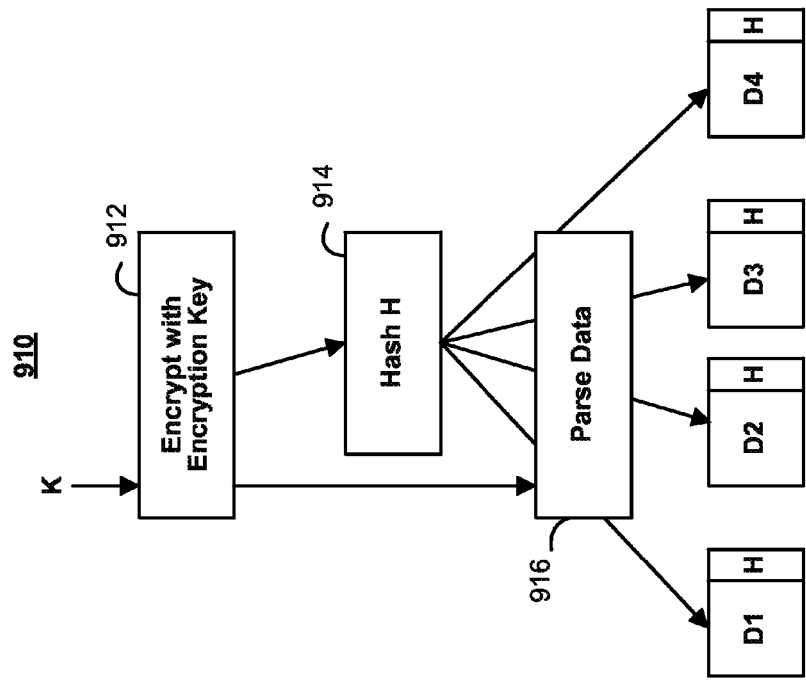
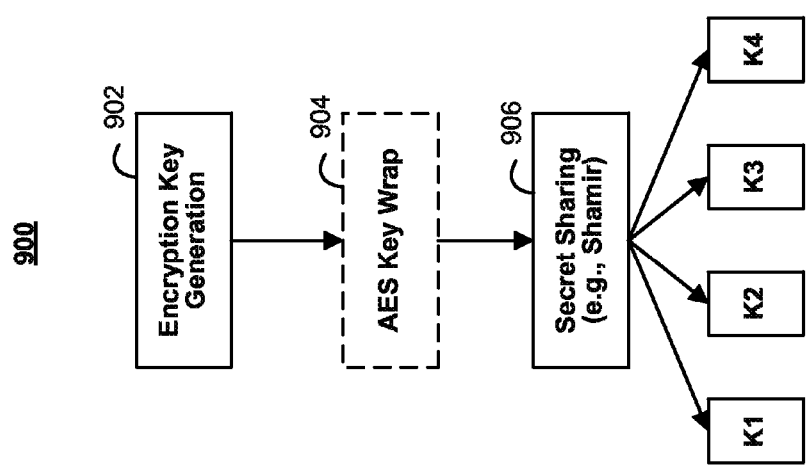
FIG. 9B
FIG. 9A

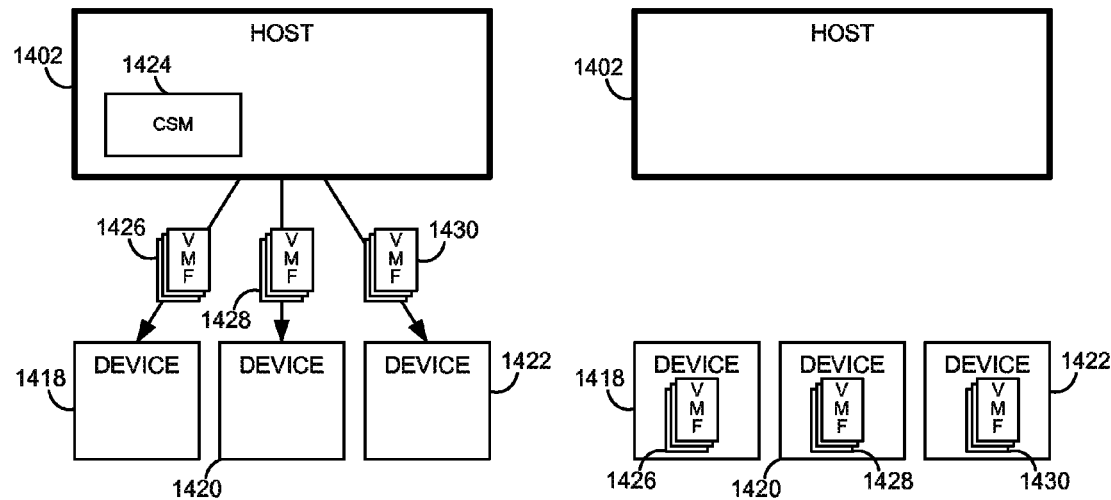
FIG. 14F  FIG. 14G
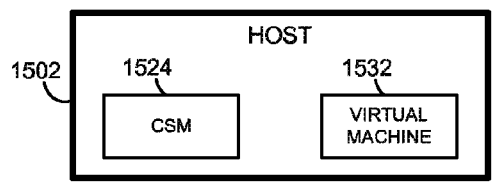
FIG. 15A
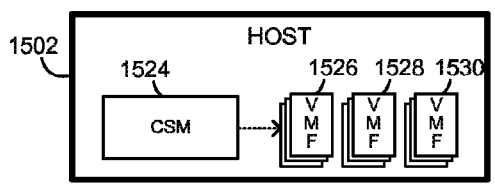
FIG. 15B

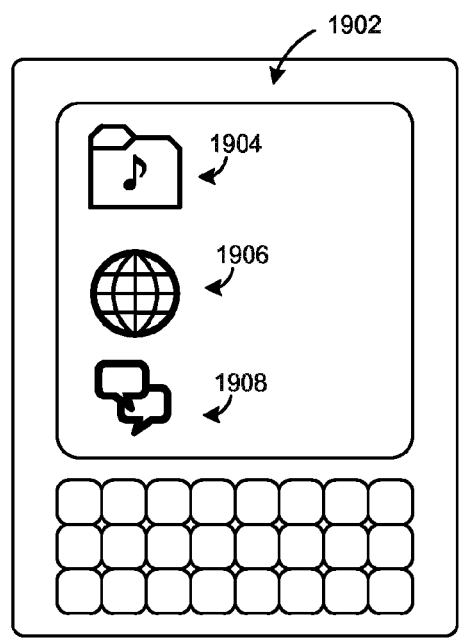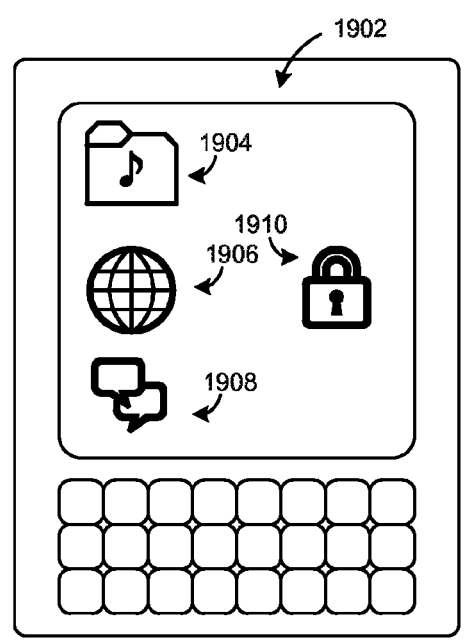
FIG. 19A  FIG. 19B

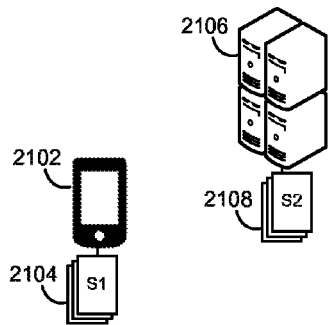
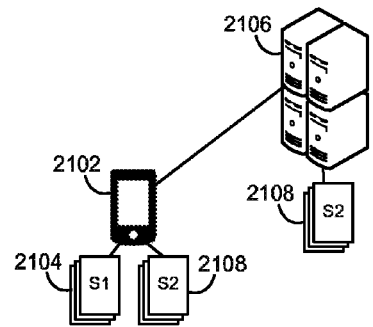
FIG. 21A                    FIG. 21B
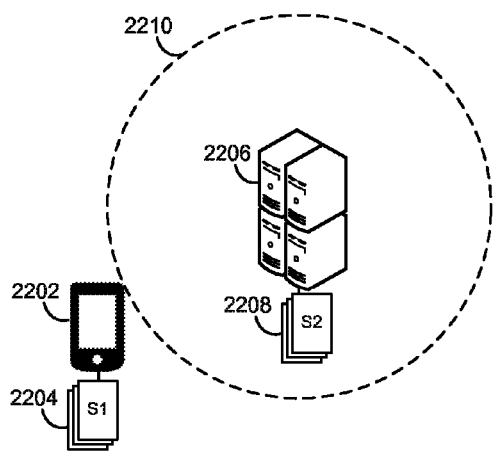
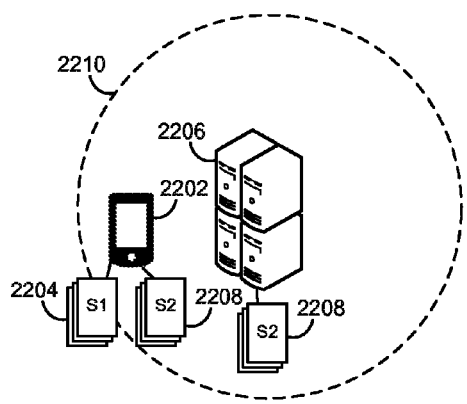
FIG. 22A                    FIG. 22B

SYSTEMS AND METHODS FOR SECURING AND RESTORING VIRTUAL MACHINES

CROSS-REFERENCE TO RELATED APPLICATION

This claims priority to U.S. Provisional Application No. 61/621,268, filed Apr. 6, 2012, the content of which is hereby incorporated by reference herein in its entirety.

TECHNICAL FIELD

This disclosure relates in general to systems and methods for securing virtual machine computing environments.

SUMMARY

In some aspects, methods are provided for securing a virtual machine. A virtual machine is executed on a host device. The virtual machine includes virtual machine files. Data parsing information that is usable to determine into which of a plurality of shares a unit of data of the virtual machine files will be placed and how the unit of data will be encrypted is generated. The virtual machine files are restorable by accessing a threshold number of the plurality of shares. In response to receiving a command to stop the virtual machine, the plurality of shares is generated based on the data parsing information, and each of the plurality of shares is caused to be stored in respective separate storage locations.

In some implementations, the host device may be a handheld computing device. The virtual machine files may include at least one of a log file, a virtual machine BIOS status file, a virtual disk file, a paging file, a snapshot state file, a suspended state file, and a configuration file. The command to stop the virtual machine may include at least one of a save command, a shut down command, a suspend command, and a pause command. The command to stop the virtual machine may be issued by a user of the host device. In some implementations, the command to stop the virtual machine is issued by a processor of the host device without a substantially contemporaneous command from a user of the host device.

In some implementations, generating the plurality of shares based on the data parsing information may involve identifying a plurality of portions of the virtual machine files and encrypting each of the plurality of portions to form the plurality of shares. In some implementations, generating the plurality of shares based on the data parsing information may involve encrypting the virtual machine files and identifying a plurality of portions of the encrypted virtual machine files to form the plurality of shares.

In some implementations, the data parsing information specifies a deterministic technique for determining into which of the plurality of shares the portion of the virtual machine files will be placed. In some implementations, the data parsing information specifies a deterministic technique for determining into which position within each of the plurality of shares the portion of the virtual machine files will be placed. In some implementations, the data parsing information specifies a substantially random technique for determining into which of the plurality of shares the portion of the virtual machine files will be placed. In some implementations, the data parsing information specifies a substantially random technique for determining into which position within each of the plurality of shares the portion of the virtual machine files will be placed.

In some implementations, the separate storage locations include a plurality of separate storage locations on the host device. In some implementations, the separate storage locations include a plurality of separate storage locations on one or more devices remote from the host device. In some implementations, the separate storage locations include at least one storage location on the host device and at least one storage location on a device remote from the host device.

In some implementations, prior to executing the virtual machine on the host device, a second plurality of shares may be received, and the virtual machine files from the second plurality of shares may be restored using data restoring information that determines how to decrypt and arrange portions from the plurality of shares to form the virtual machine files. The second plurality of shares may be received from one or more devices remote from the host device. The one or more devices remote from the host device may include one or more data servers. The separate storage locations in which the plurality of shares are respectively stored may be located on the one or more devices remote from the host device from which the second plurality of shares is received.

In some implementations, prior to generating data parsing information, a third plurality of shares may be received, and an executable parsing application may be restored from the third plurality of shares. The data parsing information may be generated by the executable parsing application. The third plurality of shares may be received from one or more devices remote from the host device. The one or more devices remote from the host device include one or more data servers. In some implementations, restoring the executable parsing application from the third plurality of shares may involve assembling the third plurality of shares according to a technique stored in and executable by the host device. In some implementations, restoring the executable parsing application from the third plurality of shares involves assembling the third plurality of shares according to a technique specified in the third plurality of shares and executable by the host device.

In some implementations, the threshold number is less than a total number of the plurality of shares. The data parsing information may determine the size of each of the shares, wherein the size of at least one share is different from the size of at least one other share. The host device may include one or more computers in a distributed architecture and/or one or more computers in a cloud computing environment.

In other aspects, methods are provided for restoring a data set in response to receiving a predetermined sequence of user inputs. A computer system generates a plurality of user-selectable elements for display by a display of a computer device of the computer system, each element associated with a different executable application. A predetermined sequence of user inputs is received at the computer device while the plurality of user-selectable elements is displayed, and in response to receiving the predetermined sequence of user inputs, a cryptographic restoration application not associated with any displayed user-selectable element is executed to restore a data set from a plurality of data set shares (each data set share representative of an encrypted portion of the data set).

In some implementations, the computer device is a handheld computer device. The user-selectable elements may include at least one icon and/or at least one drop-down menu listing. In some implementations, the predetermined sequence of user inputs includes a gestural input, a biometric recognition input, an orientation of the computer device, a keypad input, and/or an acceleration of the computer device. In response to restoring the data set from the plurality of data set shares, a graphical element associated with the data set may be displayed on the display.

In some implementations, the data set may be associated with an application executable by the computer device, and in response to restoring the data set from the plurality of data set shares, the application associated with the data set may be executed. The application may be a telephonic communication application.

In some implementations, the application is a virtual machine application. In such implementations, the data set may be representative of virtual machine files, and executing the application associated with the data set may involve starting a virtual machine using the virtual machine files. Further, the virtual machine files may include at least one of a log file, a virtual machine BIOS status file, a virtual disk file, a paging file, a snapshot state file, a suspended state file, and a configuration file.

In some implementations, two or more data set shares of the plurality of data set shares are stored in respective separate storage locations on the computer device. In some implementations, at least one data set share of the plurality of data set shares may be stored on the computer device, and at least one data set share of the plurality of data set shares may be stored on a device remote from the computer device. In some implementations, two or more data set shares of the plurality of data set shares are stored in separate storage locations on one or more devices remote from the computer device.

In some implementations, each data set share may represent a portion of data from the data set selected and/or arranged according to a deterministic technique. In some implementations, each data set share may represent a portion of data from the data set selected and/or arranged according to a substantially random technique. The computing system may include one or more computers in a distributed architecture and/or one or more computers in a cloud computing environment.

In other aspects, methods are provided for restoring a data set from data set shares from a plurality of computer devices. First data set shares stored on a first computer device of a programmed computer system are identified. Each first data set share is representative of a portion of data from the data set, wherein the data set cannot be restored from the first identified data set shares but can be restored by a threshold number of data set shares. A communication link between the first computer device and a second computer device different from the first computer device is detected, and in response to the detection, second data set shares from the second computer device are received at the first computer device. When the first and second data set shares are determined to include at least the threshold number of data set shares, the data set is restored using the first and second data set shares.

In some implementations, detecting a communication link involves determining that the second computer device is within a communication range of a radio frequency communication device of the first computer device. The radio frequency communication device may be a Bluetooth device or a near-field communication device. In other implementations, detecting a communication link involves determining that the second computer device is connected to a computer communications network to which the first computer device is also connected.

In some implementations, detecting a communication link involves determining that the second computer device is within a predetermined geographical distance of the first computer device. In such implementations, determining that the second computer device is within a predetermined geographical distance of the first computer device may involve receiving, at the first computer device, a message from a server indicating proximity of the second computer device.

In some implementations, detecting a communication link involves detecting an electrical communication pathway between the first computer device and the second computer device via a body of a user of the first computer device and a body of a user of the second computer device, the bodies of the users in physical contact with each other and with their respective computer devices.

In some implementations, prior to identifying the first data set shares, at least some of the first data set shares from a third computer device may be received in response to detecting a communication link between the first computer device and the third computer device.

The first computer device and/or the second computer device may be a handheld computer device. In some implementations, the second computer device includes a server.

In some implementations, in response to restoring the data set from the first and second data set shares, a graphical element associated with the data set may be displayed on a display of the first computer device. In some implementations, the data set is associated with an application executable by the computer device, and in response to restoring the data set from the plurality of data set shares, the application associated with the data set is executed. The application may be a gaming application.

In some implementations, in response to detecting the communication link, the first data set shares may be transmitted from the first computer device to the second computer device. In some implementations, the second data set shares are received via the communication link. In some implementations, each data set share may represent a portion of data from the data set selected and/or arranged according to a deterministic technique. In some implementations, each data set share may represent a portion of data from the data set selected and/or arranged according to a substantially random technique. The first computer device and second computer device may be arranged in a distributed architecture and/or may be in a cloud computing environment.

According to other aspects, systems are provided for carrying out the functionalities described above.

BRIEF DESCRIPTION OF THE DRAWINGS

The present disclosure is described in more detail below in connection with the attached drawings, which are meant to illustrate and not to limit the disclosure, and in which:

FIGS. 9A and 9B are simplified and illustrative process flow diagrams for header generation and data splitting for data in motion that may be used in any suitable combination, with any suitable additions, deletions, or modifications in accordance with one implementation.

FIGS. 14A-14G are block diagrams of a secure VM environment configured to execute the process of FIG. 13 in accordance with one implementation.

FIGS. 15A-15B are block diagrams of another secure VM environment configured to execute the process of FIG. 13 in accordance with one implementation.

FIGS. 19A and 19B depict displays on a portable device that may be presented before and after the predetermined sequence of user inputs is identified in the process of FIG. 18 in accordance with one implementation.

FIGS. 21A and 21B illustrate an implementation of some of the steps of FIG. 20.

FIGS. 22A and 22B illustrate another implementation of some of the steps of FIG. 20.

DETAILED DESCRIPTION

Figure 1:
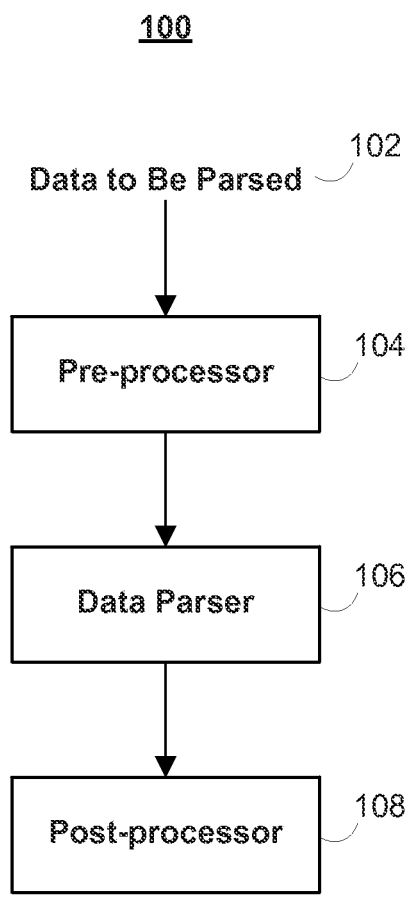
FIG. 1 illustrates a process for securing data including illustrative features that may be used in combination with any of the processes discussed herein, in accordance with an implementation.

According to one aspect, a cryptographic system is described herein where one or more secure servers, implemented as a trust engine, store cryptographic keys and user authentication data. Users access the functionality of conventional cryptographic systems through network access to the trust engine. However, the trust engine does not release actual keys and other authentication data and therefore, the keys and data remain secure. This server-centric storage of keys and authentication data provides for user-independent security, portability, availability, and straightforwardness.

Because users can be confident in and trust the cryptographic system to perform user and document authentication and other cryptographic functions, a wide variety of functionality may be incorporated into the system. For example, the trust engine provider can ensure against agreement repudiation by, for example, authenticating the agreement participants, digitally signing the agreement on behalf of or for the participants, and storing a record of the agreement digitally signed by each participant. In addition, the cryptographic system may monitor agreements and determine to apply varying degrees of authentication, based on, for example, price, user, vendor, geographic location, place of use, or the like.

The cryptographic system may include a secure data parser either alone or in combination with other system components. As used herein, a secure data parser includes software and/or hardware configured to perform various functions relating to one or more of the parsing, securing, and storing of data. For example, the functions of the secure data parser may include any combination of encrypting data, parsing data into one or more shares, encrypting shares, dispersing shares, securely storing shares in multiple locations, retrieving data shares, decrypting data shares, reassembling data, decrypting data, or any other functions described herein. Parsing includes generating one or more distinct shares from an original data set where each of the shares includes at least a portion of the original data set. Parsing can be implemented by any of a number of techniques. For example, parsing may involve distributing data units from the original data set into one or more shares randomly, pseudo-randomly, deterministically, or using some suitable combination of random, pseudo-random, and deterministic techniques. A parsing operation may act on any size of data, including a single bit, a group of bits, a group of bytes, a group of kilobytes, a group of megabytes, or larger groups of data, as well as any pattern or combination of data unit sizes. Thus, the original data can be viewed as a sequence of these data units. In some implementations, the parsing operation is based on parsing information generated by the secure data parser or by another component in the cryptographic system. The parsing information can be in any suitable form (e.g., one or more keys including a predetermined, deterministic, pseudo-random or random key). The parsing information may determine one or more aspects of the parsing operation, including any combination of the number of shares, the size of one or more shares, the size of the data units, the order of the data units within the shares, and the order of the data from the original data set in the shares. In some embodiments, the parsing information may also indicate or may be used (among other factors) to determine how one or more data shares will be encrypted. While certain parsing techniques may render the data more secure (e.g., in some implementations, the size of the data units themselves may render the resulting data shares more secure, or the parsing may involve rearranging data data), this is not necessarily the case with every parsing technique. The resulting shares may be of any size of data, and two or more resulting shares may contain different amounts of the original data set.

In some implementations, parsing may include performing a cryptographic operation on the original data set before, during, or after generating the one or more shares. For example, parsing may involve shuffling the order of the data units in the share, e.g., by rearranging the units of data into the resulting share or shares. In some implementations, parsing may involve shuffling the order bits within each data unit, e.g., by rearranging sub-units within one or more data units that are distributed into the resulting share or shares, where a sub-unit includes at least a distinct portion of a data unit Where parsing involves shuffling data in the original data set, the shuffling operation can be performed on any size of the original data set, including the entire original data set, the one or more shares, the data units, a single bit, a group of bits, a group of bytes, a group of kilobytes, a group of megabytes, or larger groups of data, as well as any pattern or combination of data unit sizes. Shuffling data may involve distributing the original data into one or more shares in a way that shuffles the data, distributing the original data into one or more shares and then shuffling the data in the resulting share(s), shuffling the original data and then distributing the shuffled data into one or more shares, or any combination thereof.

Thus, the resulting shares may include a substantially random distribution of the original data set. As used herein, a substantially random distribution of data refers to generating one or more distinct shares from an original data set where at least one of the shares is generated using one or more random or pseudo-random techniques, random or pseudo-random information (e.g., a random or pseudo-random key), or any combination thereof. It will be understood that because generating a truly random number in a computer may not be practical, the use of a substantially random number will be sufficient. References to randomization herein is understood to include substantial randomization as when, for example, implemented using a computing device having limitations with regard to generating true randomization. As one example of data parsing that results in substantially random distribution of the original data into shares, consider an original data set 23 bytes in size, with the data unit size chosen to be one byte, and with the number of shares selected to be 4. Each byte would be distributed into one of the 4 shares. Assuming a substantially random distribution, a key would be obtained to create a sequence of 23 random numbers ($r_1$, $r_2$, $r_3$ through $r_{23}$), each with a value between 1 and 4 corresponding to the four shares. Each of the units of data (in this example, 23 individual bytes of data) is associated with one of the 23 random numbers corresponding to one of the four shares. The distribution of the bytes of data into the four shares would occur by placing the first byte of the data into share number $r_1$, byte two into share $r_2$, byte three into share $r_3$, through the $23^{rd}$ byte of data into share $r_{23}$. A wide variety of other possible steps or combination or sequence of steps, including adjusting the size of the data units, may be used in the parsing process. To recreate the original data, the reverse operation would be performed.

A parsing operation may add fault tolerance to the generated shares so that fewer than all of the shares are needed to restore the original data. For example, the parsing operation may provide sufficient redundancy in the shares such that only a subset of the shares is needed to reassemble or restore the data to its original or useable form. For example, the parsing may be done as a "3 of 4" parse, such that only three of the four shares are necessary to reassemble or restore the data to its original or useable form. This is also referred to as a "M of N parse" wherein N is the total number of shares, and M is at least one less than N.

FIG. 1 shows an illustrative secure data parsing system (also referred to herein as a secure data parser) 100. The secure data parsing system 100 may be implemented using hardware and/or software such as a parser program or software suite. The secure data parser may further include or interface with one or more data storage facilities and other hardware or software modules from which data can be received or transmitted and which may perform various functions on the data. The system 100 may include one or more of pre-processors 104, one or more data parsers 106, and one or more post-processors 108. All of features described with respect to the system 100 are optional and the operations performed by pre-processor 104, data parser 106, and post-processor 108 may be performed in any possible combination or order. The secure data parser 100 receives data to be secured 102 and passes the data to a pre-processor 104 that may perform any combination of pre-processing operations on the received data 102, such as encrypting the data, adding integrity information (e.g., a hash) to the data, and adding authentication information to the data. The pre-processing may alternatively or additionally involve accessing and/or generating one or more keys or other information used by the secure data parser 100. The one or more keys can be any suitable key(s) for generating distinct portions of data from an original data set and/or any suitable key for other operations described herein that are performed by the secure data parser 100. The key(s) may be generated randomly, pseudo-randomly, or deterministically. These and other pre-processing operations are described further herein.

After any desired pre-processing, the (optionally transformed) data 102 and any additional information, such as any suitable keys, are passed to a data parser 106. Data parser 106 may parse the received data to generate one or more shares from the data 102 using any of the parsing techniques described herein. The data parser 106 may use any suitable key for data parsing.

In some implementations, data parser 106 involves parsing one or more keys used in the encryption or parsing of the data. Any of the above-described parsing techniques may be used parse any key. In some embodiments, parsing a key causes the key to be stored in one or more shares, of the parsed data 102. In other embodiments, the key shares resulting from a key parsing operation are stored separately from the data shares resulting from the data parsing operation. These and other features and functions that may be performed by data parser 106 are described further herein.

After parsing the data and/or any keys, the parsed data and keys may be post-processed by one or more post-processors 108. The post-processor 108 may perform any one or more operations on the individual received data shares, such as encrypting one or more data shares, adding integrity information (e.g., a hash) to one or more shares, and adding authentication information to one or more shares. Post-processor 108 may also perform any one or more operations on the received keys or key shares, such as encrypting one or more keys or key shares, adding integrity information (e.g., a hash) to one or more keys or key shares, and adding authentication information to one or more keys or key shares. Post-process may also direct the data shares, keys, and/or key shares to be transmitted or stored. These and other features and functions that may be performed by post-processor 108 are described further herein.

The combination and order of processes used by the secure data parser 100 may depend on the particular application or use, the level of security desired, whether optional pre-encryption, post-encryption, or both, are desired, the redundancy desired, the capabilities or performance of an underlying or integrated system, or any other suitable factor or combination of factors.

In one implementation, the data parser 106 parses the data to generate four or more shares of data or keys, and the post-processor 108 encrypts all of the shares, then stores these encrypted shares in different locations in the database from which they were received. Alternatively or additionally, the post-processor 108 may relocate the encrypted shares to any of one or more suitable storage devices, which may be fixed or removable, depending on the requestor's need for privacy and security. In particular, the encrypted shares can be stored virtually anywhere, including, but not limited to, a single server or data storage device, or among separate data storage facilities or devices. Management of any keys used by the secure data parser 100 may be handled by the secure data parser 100, or may be integrated into an existing infrastructure or any other desired location. The retrieval, recombining, reassembly or reconstituting of the encrypted data shares may also utilize any number of authentication techniques, including, but not limited to, biometrics, such as fingerprint recognition, facial scan, hand scan, iris scan, retinal scan, ear scan, vascular pattern recognition or DNA analysis.

Traditional encryption technologies rely on one or more keys used to encrypt the data and render it unusable without the one or more keys. The data, however, remains whole and intact and subject to attack. In some embodiments, the secure data parser addresses this problem by parsing the encrypted file into two or more shares, adding another layer of encryption to each share of the data, and then storing the shares in different physical and/or logical locations. When one or more data shares are physically removed from the system, either by using a removable device, such as a data storage device, or by placing the share under another party's control, any possibility of compromise of secured data is effectively removed. In some embodiments, the encrypted file is parsed into four or more portions or shares.

Figure 2:
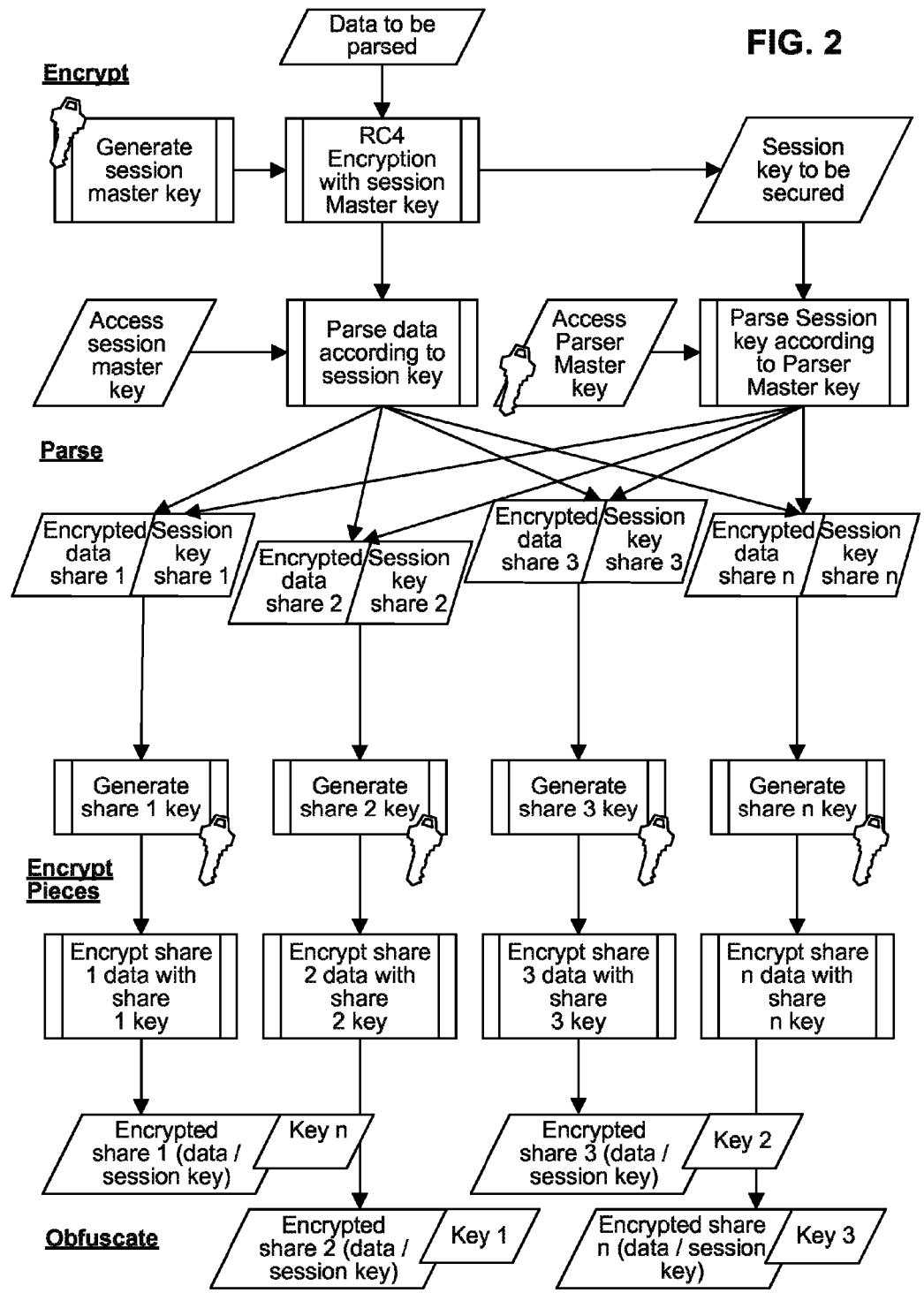
FIG. 2 illustrates a process for parsing data with encryption and storage of the encryption master key with the data in accordance with an implementation.

One example of a secure data parser is shown in FIG. 2, which shows the following steps of a process performed by the secure data parser on the data to be parsed, resulting in storing a session master key with the parsed data:

1. Generating a session master key and encrypting the data using, for example, the RS1 or the RC4 stream cipher.

2. Parsing the resulting encrypted data into four data shares according to the pattern of the session master key.

3. Parsing the session master key according to the pattern of a Parser Master Key and appending the resulting key shares to the data shares. The resulting four shares of data will contain portions of the encrypted original data and portions of the session master key. In other embodiments, the session master key is not stored with the data shares (see, e.g., FIG. 3 and accompanying discussions).

4. Generating a stream cipher key for each of the four shares.

5. Encrypting each share with its respective stream cipher key, then storing the encryption keys in different locations from the encrypted shares. As shown in FIG. 2, Share 1 is stored with Key 4, Share 2 is stored with Key 1, Share 3 is stored with Key 2, and Share 4 is stored with Key 3. However, any other pairing of keys with shares may be used, including, for example, arrangements in which more than one key is stored with a particular share, or in which the same key is parsed and stored across multiple shares.

To restore the original data format, the above steps are reversed. For example, to restore the original data in the example of FIG. 2, a sufficient number of the shares are retrieved. In implementations where the parsing operation includes redundancy, the original data can be restored from a minimum number of the total number of shares, which is less than the total number of shares. Thus, the original data can be restored from any suitable number of shares which, in this example, can range from one to four, depending on the parsing operation used. The cipher keys for each of the retrieved shares are also received. Each share may be decrypted with the stream cipher key that was used to encrypt the respective share. The session master key may be retrieved, or key shares of the parsed session master key are also retrieved from the shares. As with the data shares, the session master key can be restored from a minimum number (that may be less than or equal to all) of the total key shares, depending on key parsing operation used. The session master is restored from the key shares by reversing the key parsing operation. The data shares retrieved from the shares may also be restored by reversing the data parsing operation, which may involve the use of the retrieved or restored session master key. If the data restored by reversing the parse operation had been encrypted before parsing, the original data may be revealed by decrypting the restored data. Further processing may be performed on the data as needed.

In the above example, the secure data parser may be implemented with external session key management or secure internal storage of session keys. Upon implementation, the Parser Master Key for securing the application and for encryption purposes is generated. The incorporation of the Parser Master key in the resulting shares allows for a flexibility of sharing of secured data by individuals within a workgroup, enterprise or extended audience.

Figure 3:
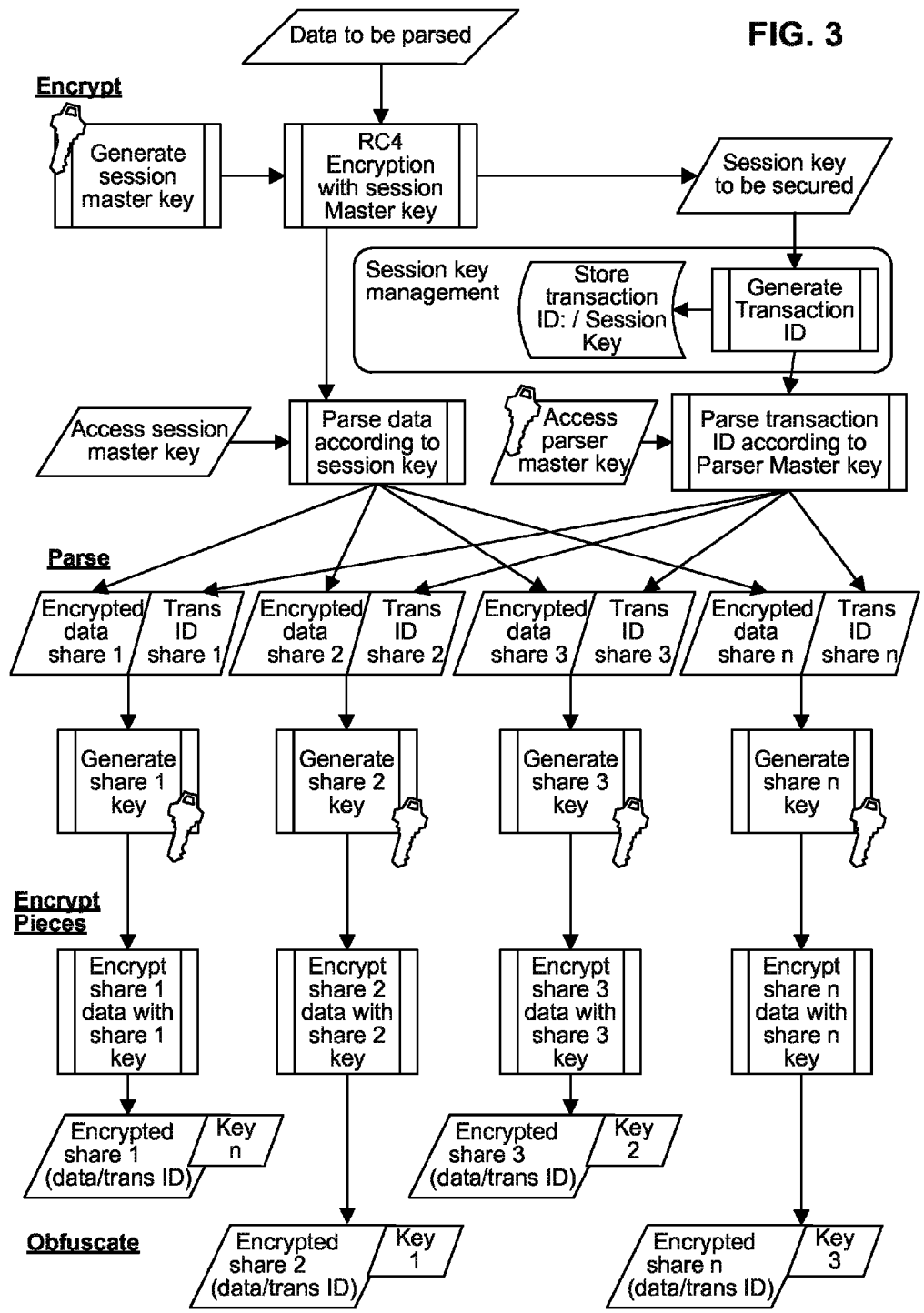
FIG. 3 illustrates a process for parsing data with encryption and storing the encryption master key separately from the data in accordance with an implementation.

FIG. 3 depicts another example of the secure data parser, including another process that may be performed by the secure data parser, resulting in storing the session master key data in one or more separate key management tables. The steps of generating a session master key, encrypting the data to be parsed with the session master key, and parsing the resulting encrypted data into four shares or portions of parsed data according to the pattern of the session master key are similar to the corresponding steps described above in relation to FIG. 2.

In this example, the session master key will be stored in a separate key management table in a data depository. A unique transaction ID is generated for this transaction. The transaction ID and session master key are stored in the separate key management table. The transaction ID is parsed according to the pattern of the Parser Master Key, and shares of the transaction ID are appended to the encrypted parsed data. The resulting four shares will contain encrypted portions of the original data and portions of the transaction ID.

As in FIG. 2, a stream cipher key is generated for each of the four data shares, each share is encrypted with its respective stream cipher key, and the encryption keys used to encrypt the data shares are stored separately from the data shares (e.g., in different locations from the encrypted data shares). To restore the original data, the steps are reversed.

Figure 4:
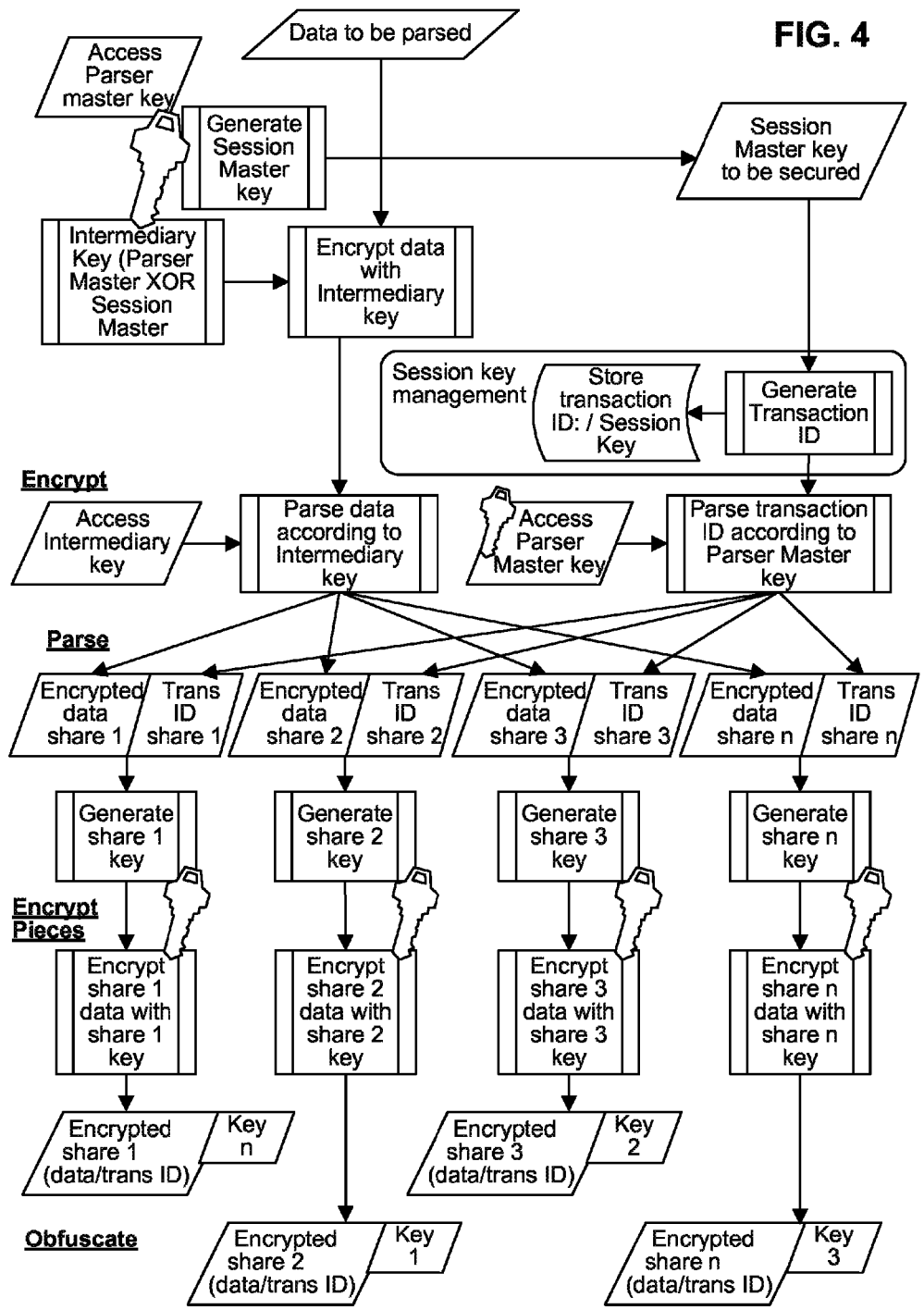
FIG. 4 illustrates the intermediary key process for parsing data with encryption and storage of the encryption master key with the data in accordance with an implementation.

FIG. 4 depicts another example of the secure data parser, including another process that may be performed by a secure data parser on the data to be parsed. This example involves use of an intermediary key. The process includes the following steps:

1. Accessing a Parser Master Key associated with the authenticated user.

2. Generating a unique Session Master key.

3. Deriving an Intermediary Key, for example, using an exclusive OR (XOR) function of the Parser Master Key and Session Master key.

4. Optionally encrypting the data using an encryption algorithm keyed with the Intermediary Key.

5. Parsing the optionally encrypted data into four shares of parsed data according to the pattern of the Intermediary Key.

6. Generating a unique transaction ID and storing the transaction ID and session master key in a separate key management table.

7. Parsing the transaction ID according to the pattern of the Parser Master Key.

8. Appending shares of the transaction ID to the shares of parsed data. The resulting combined shares will contain optionally encrypted portions of the original data and portions of the session master key.

9. Optionally generating an encryption key for each of the four data shares.

10. Optionally encrypting each share with an existing or new encryption algorithm, then storing the encryption keys in different locations from the combined shares. As shown in FIG. 4, Share 1 is stored with Key 4, Share 2 is stored with Key 1, Share 3 is stored with Key 2, and Share 4 is stored with Key 3.

To restore the original data format, the steps are reversed.

In some embodiments, the above steps 6-8 above may be replaced by the following steps:

6. Storing the Session Master Key along with the secured data shares in a data depository.

7. Parsing the session master key according to the pattern of the Parser Master Key.

8. Appending the key data to the optionally encrypted shares.

Certain steps of the methods described herein (e.g., the steps described for any of the methods depicted in FIGS. 2-4) may be performed in different order, or repeated multiple times, as desired. It is also readily apparent to those skilled in the art that the portions of the data may be handled differently from one another. For example, multiple parsing steps may be performed on only one portion of the parsed data. Each portion of parsed data may be uniquely secured in any desirable way provided only that the data may be reassembled, reconstituted, reformed, decrypted or restored to its original or other usable form. It is understood that one or more of these methods may be combined in the same implementation without departing from the scope of the disclosure.

The data secured according to the methods described herein is readily retrievable and restored, reconstituted, reassembled, decrypted, or otherwise returned into its original or other suitable form for use. In order to restore the original data, the following items may be utilized:

1. Some or all shares or portions of the data set.

2. Knowledge of and ability to reproduce the process flow of the method used to secure the data.

3. Access to the session master key.

4. Access to the Parser Master Key.

In some embodiments, not all of these items may be required to retrieve and restore, reconstitute, reassemble, decrypt, or otherwise return into the original or other suitable form for use, every unit of data secured according to one or more of the above-described methods. In some embodiments, additional items not expressly listed above may be required to restore a particular unit of data. For example, in some implementations, the above-described methods use three types of keys for encryption. Each type of key may have individual key storage, retrieval, security and recovery options, based on the installation. The keys that may be used include, but are not limited to:

1. The Parser Master Key may be an individual key associated with the installation of the secure data parser. It is installed on the server on which the secure data parser has been deployed. There are a variety of options suitable for storing this key including, but not limited to, a smart card, separate hardware key store, standard key stores, custom key stores or within a secured database table, for example.

2. The Session Master Key may be generated each time data is parsed. The Session Master Key is used to encrypt the data prior to the parsing operations. It may also be used (if the Session Master Key is not integrated into the parsed data) for parsing the encrypted data. The Session Master Key may be stored in a variety of manners, including, but not limited to, a standard key store, custom key store, separate database table, or secured within the encrypted shares, for example.

3. The Share Encryption Keys: For each share or portions of a data set that is created, an individual Share Encryption Key may be generated to further encrypt the shares. The Share Encryption Keys may be stored in different shares than the share that was encrypted.

As shown in FIG. 4, an Intermediary Key can also be utilized. The Intermediary Key may be generated each time data is parsed. The Intermediary Key is used to encrypt the data prior to the parsing operations. It may also be incorporated as a means of parsing the encrypted data.

Figure 5:
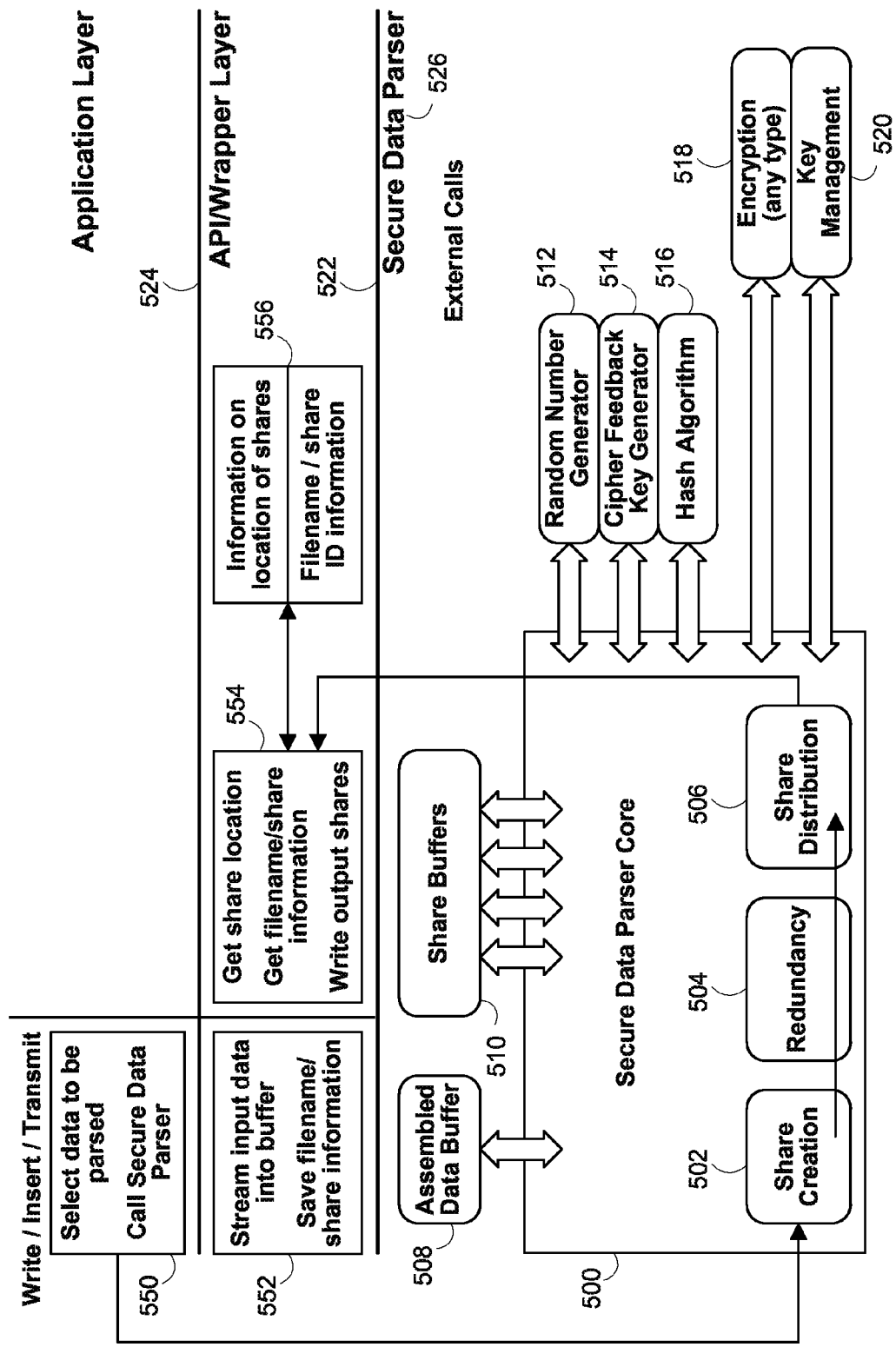
FIG. 5 and bare block diagrams of an illustrative system having the secure data parser integrated in accordance with an implementation.

FIG. 5 shows an illustrative implementation of the secure data parser as secure data parser 500. Secure data parser 500 may include built-in capabilities for parsing data into shares using module 502. Secure data parser 500 may also include built in capabilities in module 504 for performing redundancy in order to be able to implement, for example, the M of N parse described above. Secure data parser 500 may also include share distribution capabilities using module 506 for placing the shares into buffers from which they are sent for communication to a remote location, for storage, etc. It will be understood that any other suitable capabilities may be built into secure data parser 500.

Assembled data buffer 508 may be any suitable memory used to store the original data (although not necessarily in its original form) that will be parsed by secure data parser 500. In a parsing operation, assembled data buffer 508 provides input to secure data parser 500. In a restore operation, assembled data buffer 508 may be used to store the output of secure data parser 500.

Share buffers 510 may be one or more memory modules that may be used to store the multiple shares of data that resulted from the parsing of original data. In a parsing operation, share buffers 510 hold the output of the secure data parser. In a restore operation, share buffers hold the input to secure data parser 500.

It will be understood that any other suitable arrangement of capabilities may be built-in for secure data parser 500. Any additional features may be built-in and any of the features illustrated may be removed, made more robust, made less robust, or may otherwise be modified in any suitable way. Buffers 508 and 510 are likewise merely illustrative and may be modified, removed, or added to in any suitable way.

Any suitable modules implemented in software, hardware or both may be called by or may call to secure data parser 500. As illustrated, some external modules include random number generator 512, cipher feedback key generator 514, hash algorithm 516, any one or more types of encryption 518, and key management 520. It will be understood that these are merely illustrative external modules. Any other suitable modules may be used in addition to or in place of those illustrated. If desired, one or more external modules may replace capabilities that are built into secure data parser 500.

Cipher feedback key generator 514 may generate, for each secure data parser operation, a unique key, or random number (using, for example, random number generator 512), to be used as a seed value for an operation that extends an original session key size (e.g., a value of 128, 256, 512, or 1024 bits) into a value equal to the length of the data to be parsed. Any suitable algorithm may be used for the cipher feedback key generation, such as the AES cipher feedback key generation algorithm.

In order to facilitate integration of secure data parser 500 and its external modules (i.e., secure data parser layer 526) into an application layer 524 (e.g., an email application or database application), a wrapping layer that may use, for example, API function calls may be used. Any other suitable arrangement for integrating secure data parser layer 526 into application layer 524 may be used.

FIG. 5 also shows how the secure data parser 500 and external modules may be used when a write (e.g., to a storage device), insert (e.g., in a database field), or transmit (e.g., across a network) command is issued in application layer 524. At step 550 data to be parsed is identified and a call is made to the secure data parser. The call is passed through wrapper layer 522 where at step 552, wrapper layer 522 streams the input data identified at step 550 into assembled data buffer 508. Also at step 552, any suitable share information, filenames, any other suitable information, or any combination thereof may be stored (e.g., as information 556 at wrapper layer 522). Secure data processor 500 then parses the data it takes as input from assembled data buffer 508. It outputs the data shares into share buffers 510. At step 554, wrapper layer 522 obtains from stored information 556 any suitable share information (i.e., stored by wrapper 522 at step 552) and share location(s) (e.g., from one or more configuration files). Wrapper layer 522 then writes the output shares (obtained from share buffers 510) appropriately (e.g., written to one or more storage devices, communicated onto a network, etc.).

Figure 6:
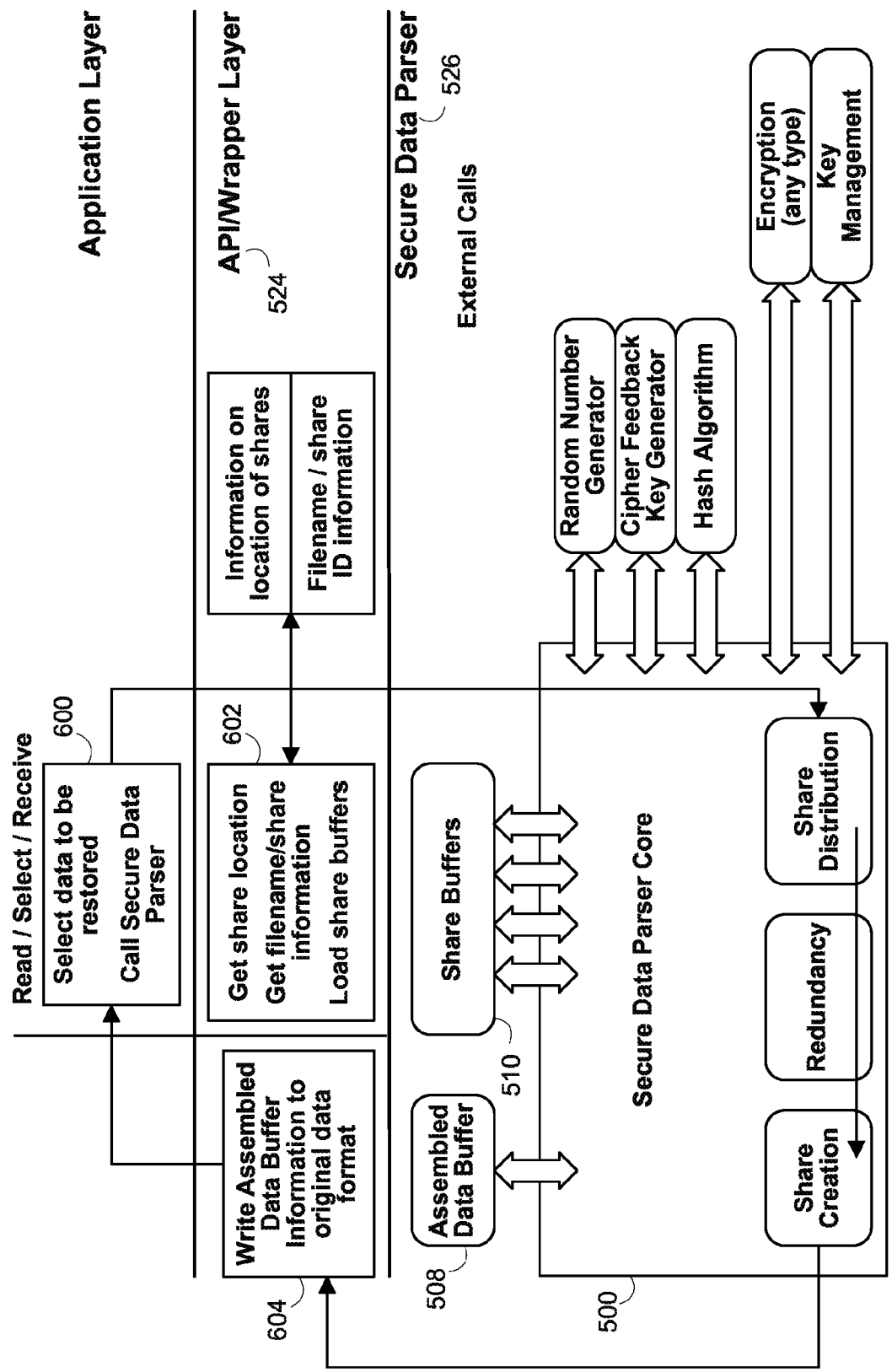

FIG. 6 shows how the secure data parser 500 and external modules may be used when a read (e.g., from a storage device), select (e.g., from a database field), or receive (e.g., from a network) occurs. At step 600, data to be restored is identified and a call to secure data parser 500 is made from application layer 524. At step 602, from wrapper layer 522, any suitable share information is obtained and share location is determined. Wrapper layer 522 loads the portions of data identified at step 600 into share buffers 510. Secure data parser 500 then processes these shares as described herein (e.g., if only three of four shares are available, then the redundancy capabilities of secure data parser 500 may be used to restore the original data using only the three shares). The restored data is then stored in assembled data buffer 508. At step 504, application layer 522 converts the data stored in assembled data buffer 508 into its original data format (if necessary) and provides the original data in its original format to application layer 524.

Figure 7:
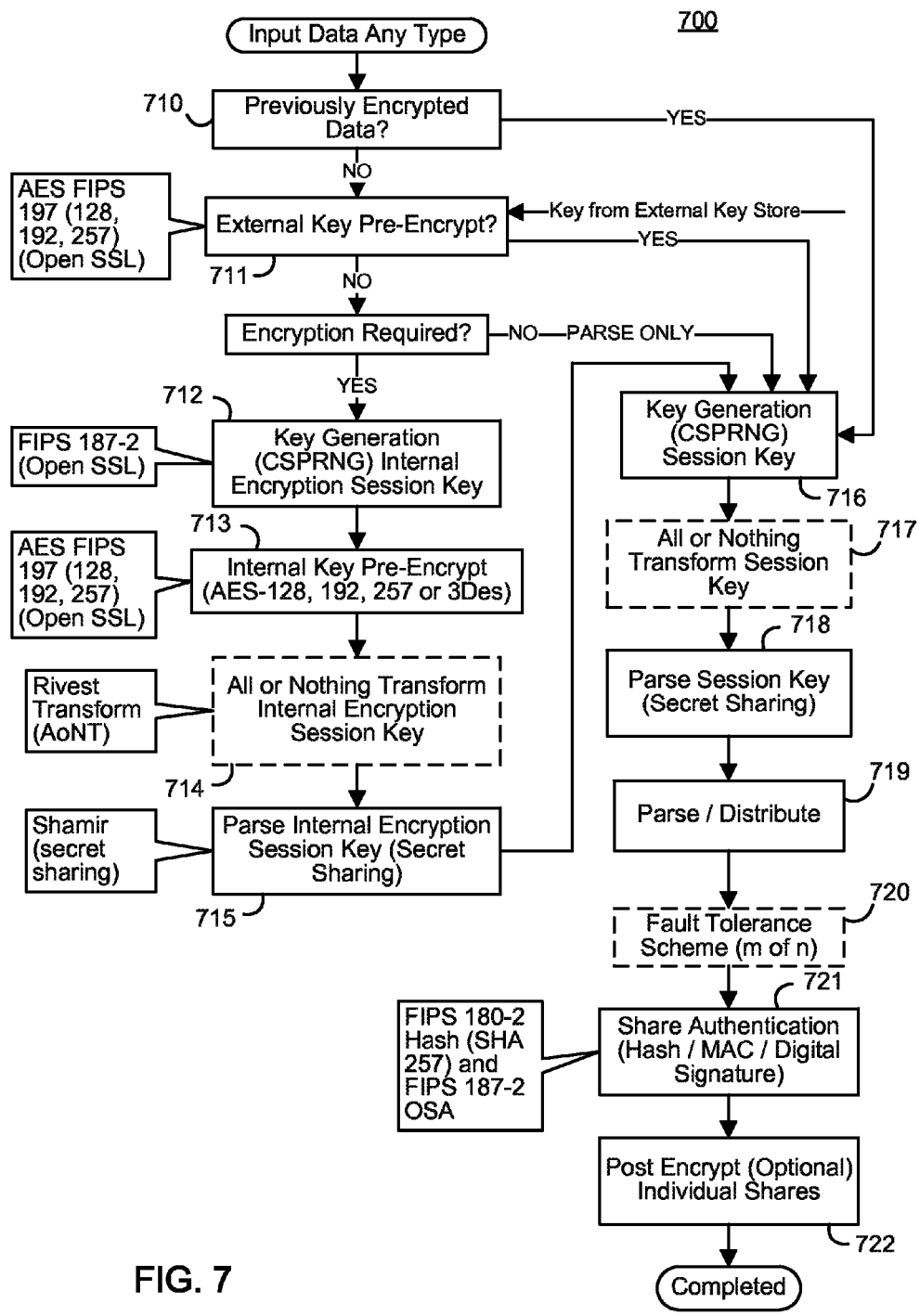
FIG. 7 is a process flow diagram of illustrative steps and features that may be used in any suitable combination, with any suitable additions, deletions, or modifications in accordance with an implementation.

FIG. 7 depicts example options 700 for using the components of the secure data parser. Several exemplary combinations of options are outlined below in reference to FIG. 7. As described in relation to FIGS. 5 and 6, the secure data parser may be modular in nature, allowing for any known algorithm to be used within each of the function blocks shown in FIG. 7. The labels shown in the example of FIG. 7 merely depict one possible combination of algorithms. Any suitable algorithm or combination of algorithms may be used in place of the labeled algorithms. For example, other key parsing (e.g., secret sharing) algorithms such as Blakely may be used in place of Shamir, or the AES encryption could be replaced by other known encryption algorithms such as Triple DES.

1) 710, 716, 717, 718, 719, 720, 721, 722

If previously encrypted data is received at step 710, the data may be parsed into a predefined number of shares. If the parse algorithm requires a key, a session key may be generated at step 716 using a cryptographically secure pseudo-random number generator. The session key may optionally be transformed using an All or Nothing Transform (AoNT) into a transform session key at step 717 before being parsed into the predefined number of shares with fault tolerance at step 718. The data may then be parsed into the predefined number of shares at step 719. A fault tolerant scheme may be used at step 720 to allow for regeneration of the data from less than the total number of shares. Once the shares are created, authentication/integrity information may be embedded into the shares at step 721. Each share may be optionally post-encrypted at step 722.

2) 711, 716, 717, 718, 719, 720, 721, 722

In some embodiments, the input data may first be encrypted using a pre-encryption key provided by a user or an external system before the data is parsed. An external pre-encryption key is provided at step 711. For example, the key may be provided from an external key store. If the parse algorithm requires a key, the session key may be generated using a cryptographically secure pseudo-random number generator at step 716. The session key may optionally be transformed using an All or Nothing Transform (AoNT) into a transform session key at step 717 before being parsed into the predefined number of shares with fault tolerance at step 718. The data is then parsed to a predefined number of shares at step 719. A fault tolerant scheme may be used at step 720 to allow for regeneration of the data from less than the total number of shares. Once the shares are created, authentication/integrity information may be embedded into the shares at step 721. Each share may be optionally post-encrypted at step 722.

3) 712, 713, 714, 715, 716, 717, 718, 719, 720, 721, 722

In some embodiments, encryption is required but an external key for the pre-encryption is not used. In such embodiments, an encryption key may be generated using a cryptographically secure pseudo-random number generator at step 712 to transform the data. Encryption of the data using the generated encryption key may occur at step 713. The encryption key may optionally be transformed using an All or Nothing Transform (AoNT) into a transform encryption key at step 714. The transform encryption key and/or generated encryption key may then be parsed into the predefined number of shares with fault tolerance at step 715. If the parse algorithm requires a key, generation of the session key using a cryptographically secure pseudo-random number generator may occur at step 716. The session key may optionally be transformed using an All or Nothing Transform (AoNT) into a transform session key at step 717 before being parsed into the predefined number of shares with fault tolerance at step 718. The data may then be parsed into a predefined number of shares at step 719. A fault tolerant scheme may be used at step 720 to allow for regeneration of the data from less than the total number of shares. Once the shares are created, authentication/integrity information will be embedded into the shares at step 721. Each share may then be optionally post-encrypted at step 722.

The secure data parser may offer flexible data protection by facilitating physical separation. Data may be first encrypted, then parsed into shares with "m of n" fault tolerance. This allows for regeneration of the original information when less than the total number of shares is available. For example, some shares may be lost or corrupted in transmission. The lost or corrupted shares may be recreated from fault tolerance or integrity information appended to the shares, as discussed in more detail below.

In order to create the shares, a number of keys are optionally utilized by the secure data parser described above. These keys may include one or more of the following:

Pre-encryption key: When pre-encryption of the shares is selected, an external encryption key may be passed to the secure data parser. This key may be generated and stored externally in a key store (or other location) and may be used to optionally encrypt data prior to parsing the data.

Internal encryption key: This key may be generated internally and used by the secure data parser to encrypt the data prior to parsing. This key may then be stored securely within the shares using a key parsing algorithm.

Session key: This key is not used with an encryption algorithm; rather, it may be used to key the data partitioning algorithms when random parsing is selected. When a random parse is used, a session key may be generated internally and used by the secure data parser to partition the data into shares. This key may be stored securely within the shares using a key parsing algorithm.

Post encryption key: When post encryption of the shares is selected, an external key may be passed to the secure data parser and used to post encrypt the individual shares. This key may be generated and stored externally in a key store or other suitable location.

In some embodiments, when data is secured using the secure data parser in this way, the information may only be reassembled provided that all of the required shares and external encryption keys are present.

In addition to the individual protection of information assets, there is sometimes a requirement to share information among different groups of users or communities of interest. It may then be necessary to either control access to the individual shares within that group of users or to share credentials among those users that would only allow members of the group to reassemble the shares. To this end, a workgroup key may be deployed to group members. The workgroup key should be protected and kept confidential, as compromise of the workgroup key may potentially allow those outside the group to access information. The workgroup key concept allows for enhanced protection of information assets by encrypting key information stored within the shares. Once this operation is performed, even if all required shares and other external keys are discovered, an attacker has no hope of recreating the information without access to the workgroup key.

Figure 8:
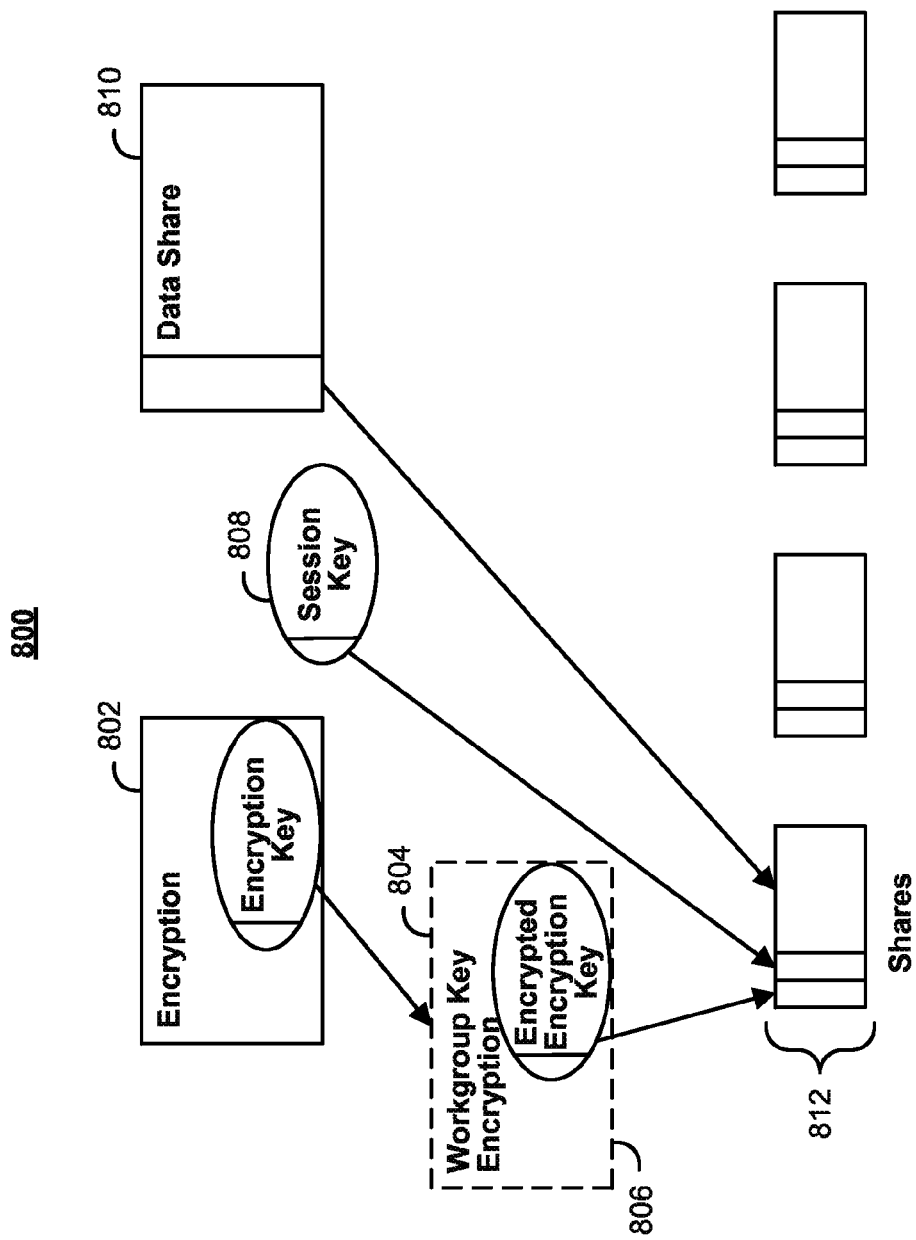
FIG. 8 is a simplified block diagram of the storage of key and data components within shares, optionally using a workgroup key, that may be used in any suitable combination, with any suitable additions, deletions, or modifications in accordance with one implementation.

FIG. 8 shows illustrative block diagram 800 for storing key and data components within the shares. In the example of diagram 800, the optional pre-encrypt and post-encrypt steps are omitted, although these steps may be included in other embodiments.

The simplified process to parse the data includes first encrypting the data using an encryption key at encryption stage 802. The encryption key may then optionally be encrypted with a workgroup key at stage 804. The encryption key, optionally encrypted by the workgroup key, may then be parsed into shares and stored within data shares 812. Session key 808 may also be parsed and stored within shares 812. Using the session key, encrypted data 810 is parsed and stored in shares 812.

In order to restore the data, the session key portions may be retrieved from the shares 812 and restored. The parsing operation of the data may then be reversed to restore the encrypted data. The shares of the encryption key (which was encrypted with the workgroup key) may be retrieved and the encrypted encryption key restored. The encrypted encryption key may then be decrypted using the workgroup key. Finally, the encrypted data may then be decrypted using the encryption key to reveal the original data.

There are several secure methods for deploying and protecting workgroup keys. The selection of which method to use for a particular application depends on a number of factors. These factors may include security level required, cost, convenience, and the number of users in the workgroup. Exemplary techniques include hardware-based key storage and software-based key storage.

Hardware-based solutions generally provide the strongest guarantees for the security of encryption/decryption keys in an encryption system. Examples of hardware-based storage solutions include tamper-resistant key token devices that store keys in a portable device (e.g., smartcard/dongle), or non-portable key storage peripherals. These devices are designed to prevent easy duplication of key material by unauthorized parties. Keys may be generated by a trusted authority and distributed to users, or generated within the hardware. Additionally, key storage systems may provide multi-factor authentication, where use of the keys requires access both a physical object (token) and a passphrase or biometric. While dedicated hardware-based storage may be desirable for high-security deployments or applications, other deployments may elect to store keys directly on local hardware (e.g., disks, RAM or non-volatile RAM stores such as USB drives). This provides a lower level of protection against insider attacks, or in instances where an attacker is able to directly access the encryption machine.

To secure keys on disk, software-based key management often protects keys by storing them in encrypted form under a key derived from a combination of other authentication metrics, including: passwords and passphrases, presence of other keys (e.g., from a hardware-based solution), biometrics, or any suitable combination. The level of security provided by such techniques may range from the relatively weak key protection mechanisms provided by some operating systems (e.g., MS Windows and Linux) to more robust solutions implemented using multi-factor authentication.

The secure data parser described herein may be advantageously used in a number of applications and technologies. For example, email system, RAID systems, video broadcasting systems, database systems, tape backup systems, or any other suitable system may have the secure data parser integrated at any suitable level. As previously discussed, it will be understand that the secure data parser may also be integrated for protection and fault tolerance of any type of data in motion through any transport medium, including, for example, wired, wireless, or physical transport mediums. As one example, voice over Internet protocol (VoIP) applications may make use of the secure data parser to solve problems relating to echoes and delays that are commonly found in VoIP. The need for network retry on dropped packets may be eliminated by using fault tolerance, which guarantees packet delivery even with the loss of a predetermined number of shares. Packets of data (e.g., network packets) may also be efficiently parsed and restored "onthe-fly" with minimal delay and buffering, resulting in a comprehensive solution for various types of data in motion. The secure data parser may act on network data packets, network voice packets, file system data blocks, or any other suitable unit of information. In addition to being integrated with a VoIP application, the secure data parser may be integrated with a file-sharing application (e.g., a peer-to-peer file-sharing application), a video broadcasting application, an electronic voting or polling application (which may implement an electronic voting protocol and blind signatures, such as the Sensus protocol), an email application, or any other network application that may require or desire secure communication.

In some embodiments, support for network data in motion may be provided by the secure data parser in two distinct phases—a header generation phase and a data parsing phase. Simplified header generation process 900 and simplified data parsing process 910 are shown in FIGS. 9A and 9B, respectively. One or both of these processes may be performed on network packets, file system blocks, or any other suitable information.

In some embodiments, header generation process 900 may be performed once at the initiation of a network packet stream. At step 902, a random (or pseudo-random) encryption key, K, may be generated. The encryption key, K, may then be optionally encrypted (e.g., using the workgroup key described above) at AES key wrap step 904. Although an AES key wrap may be used in some embodiments, any suitable key encryption or key wrap algorithm may be used in other embodiments. AES key wrap step 904 may operate on the entire encryption key, K, or the encryption key may be parsed into several blocks (e.g., 64-bit blocks). AES key wrap step 904 may then operate on blocks of the encryption key, if desired.

At step 906, a secret sharing algorithm (e.g., Shamir) may be used to parse the encryption key, K, into key shares. Each key share may then be embedded into one of the output shares (e.g., in the share headers). Finally, a share integrity block and (optionally) a post-authentication tag (e.g., MAC) may be appended to the header block of each share. Each header block may be designed to fit within a single data packet.

After header generation is complete (e.g., using simplified header generation process 900), the secure data parser may enter the data partitioning phase using simplified data parsing process 910. Each incoming data packet or data block in the stream is encrypted using the encryption key, K, at step 912. At step 914, share integrity information (e.g., a hash H) may be computed on the resulting ciphertext from step 912. For example, a SHA-256 hash may be computed. At step 916, the data packet or data block may then be partitioned into two or more data shares using one of the data parsing algorithms described above. In some embodiments, the data packet or data block may be parsed so that each data share contains a substantially random distribution of the encrypted data packet or data block. The integrity information (e.g., hash H) may then be appended to each data share. An optional post-authentication tag (e.g., MAC) may also be computed and appended to each data share in some embodiments.

Each data share may include metadata, which may be necessary to permit correct reconstruction of the data blocks or data packets. This information may be included in the share header. The metadata may include such information as cryptographic key shares, key identities, share nonces, signatures/MAC values, and integrity blocks. In order to maximize bandwidth efficiency, the metadata may be stored in a compact binary format.

For example, in some embodiments, the share header includes a cleartext header chunk, which is not encrypted and may include such elements as the Shamir key share, per-session nonce, per-share nonce, key identifiers (e.g., a workgroup key identifier and a post-authentication key identifier). The share header may also include an encrypted header chunk, which is encrypted with the encryption key. An integrity header chunk, which may include integrity checks for any number of the previous blocks (e.g., the previous two blocks), may also be included in the header. Any other suitable values or information may also be included in the share header.

Figure 10:
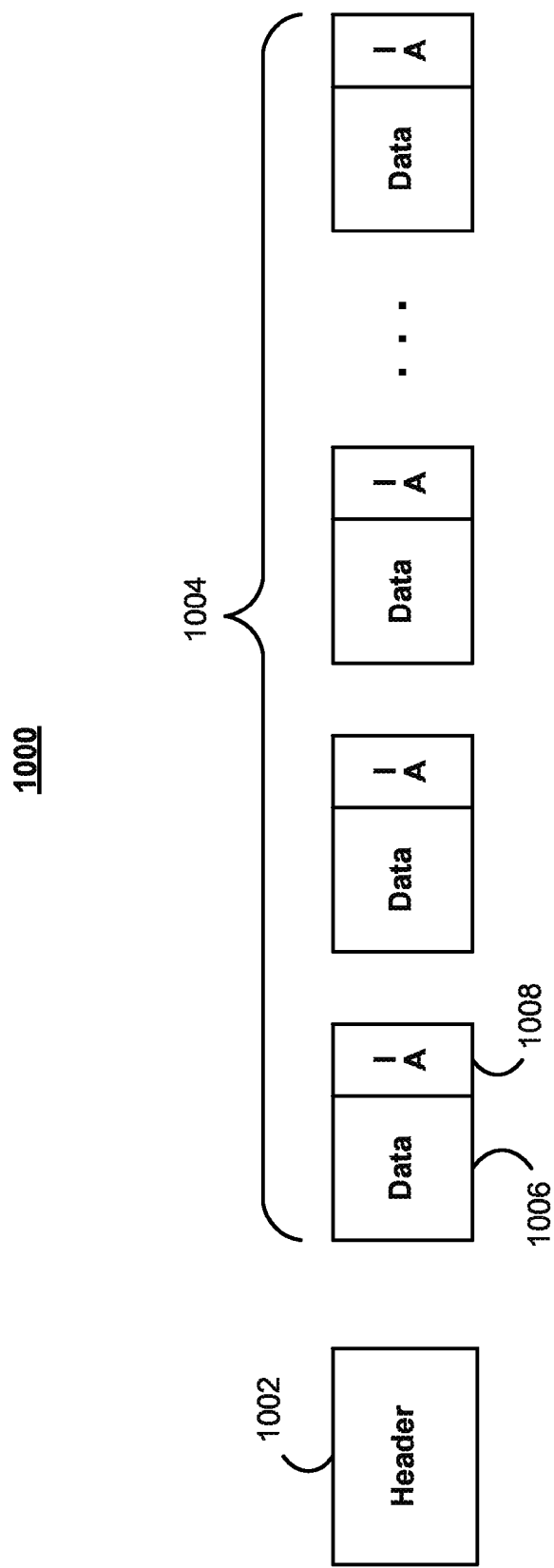
FIG. 10 is a simplified block diagram of an illustrative share format, that may be used in any suitable combination, with any suitable additions, deletions, or modifications in accordance with one implementation.

As shown in illustrative share format 1000 of FIG. 10, header block 1002 may be associated with two or more output blocks 1004. Each header block, such as header block 1002, may be designed to fit within a single network data packet. In some embodiments, after header block 1002 is transmitted from a first location to a second location, the output blocks may then be transmitted. Alternatively, header block 1002 and output blocks 1004 may be transmitted at the same time in parallel. The transmission may occur over one or more similar or dissimilar communications paths.

Each output block may include data portion 1006 and integrity/authenticity portion 1008. As described above, each data share may be secured using a share integrity portion including share integrity information (e.g., a SHA-256 hash) of the encrypted, pre-partitioned data. To verify the integrity of the outputs blocks at recovery time, the secure data parser may compare the share integrity blocks of each share and then invert the parse algorithm. The hash of the recovered data may then be verified against the share hash.

In some embodiments, a keyed secret sharing routine may be employed using keyed information dispersal (e.g., through the use of a keyed information dispersal algorithm or "IDA"). The key for the keyed IDA may also be protected by one or more external workgroup keys, one or more shared keys, or any combination of workgroup keys and shared keys. In this way, a multi-factor secret sharing scheme may be employed. To reconstruct the data, at least "M" shares plus the workgroup key(s) (and/or shared key(s)) may be required in some embodiments. The IDA (or the key for the IDA) may also be driven into the encryption process. For example, the transform may be driven into the clear text (e.g., during the pre-processing layer before encrypting) and may further protect the clear text before it is encrypted.

In some embodiments, the session key may be encrypted using a shared key (e.g., a workgroup key) before being parsed to generate one session key shares. Two or more user shares may then be formed by combining at least one encrypted data set share and at least one session key share. In forming a user share, in some embodiments, the at least one session key share may be interleaved into an encrypted data set share. In other embodiments, the at least one session key share may be inserted into an encrypted data set share at a location based at least in part on the shared workgroup key. For example, keyed information dispersal may be used to distribute each session key share into a unique encrypted data set share to form a user share. Interleaving or inserting a session key share into an encrypted data set share at a location based at least in part on the shared workgroup may provide increased security in the face of cryptographic attacks. In other embodiments, one or more session key shares may be appended to the beginning or end of an encrypted data set share to form a user share. The collection of user shares may then be stored separately on at least one data depository. The data depository or depositories may be located in the same physical location (for example, on the same magnetic or tape storage device) or geographically separated (for example, on physically separated servers in different geographic locations). To reconstruct the original data set, an authorized set of user shares and the shared workgroup key may be required.

The secure data parser may be used to implement a cloud computing data security solution. Cloud computing is network-based computing, storage, or both where computing and storage resources may be provided to computer systems and other devices over a network. Cloud computing resources are generally accessed over the Internet, but cloud computing may be performed over any suitable public or private network. Cloud computing may provide a level of abstraction between computing resources and their underlying hardware components (e.g., servers, storage devices, networks), enabling remote access to a pool of computing resources. These cloud computing resources may be collectively referred to as the "cloud." Cloud computing may be used to provide dynamically scalable and often virtualized resources as a service over the Internet or any other suitable network or combination of networks.

Figure 11:
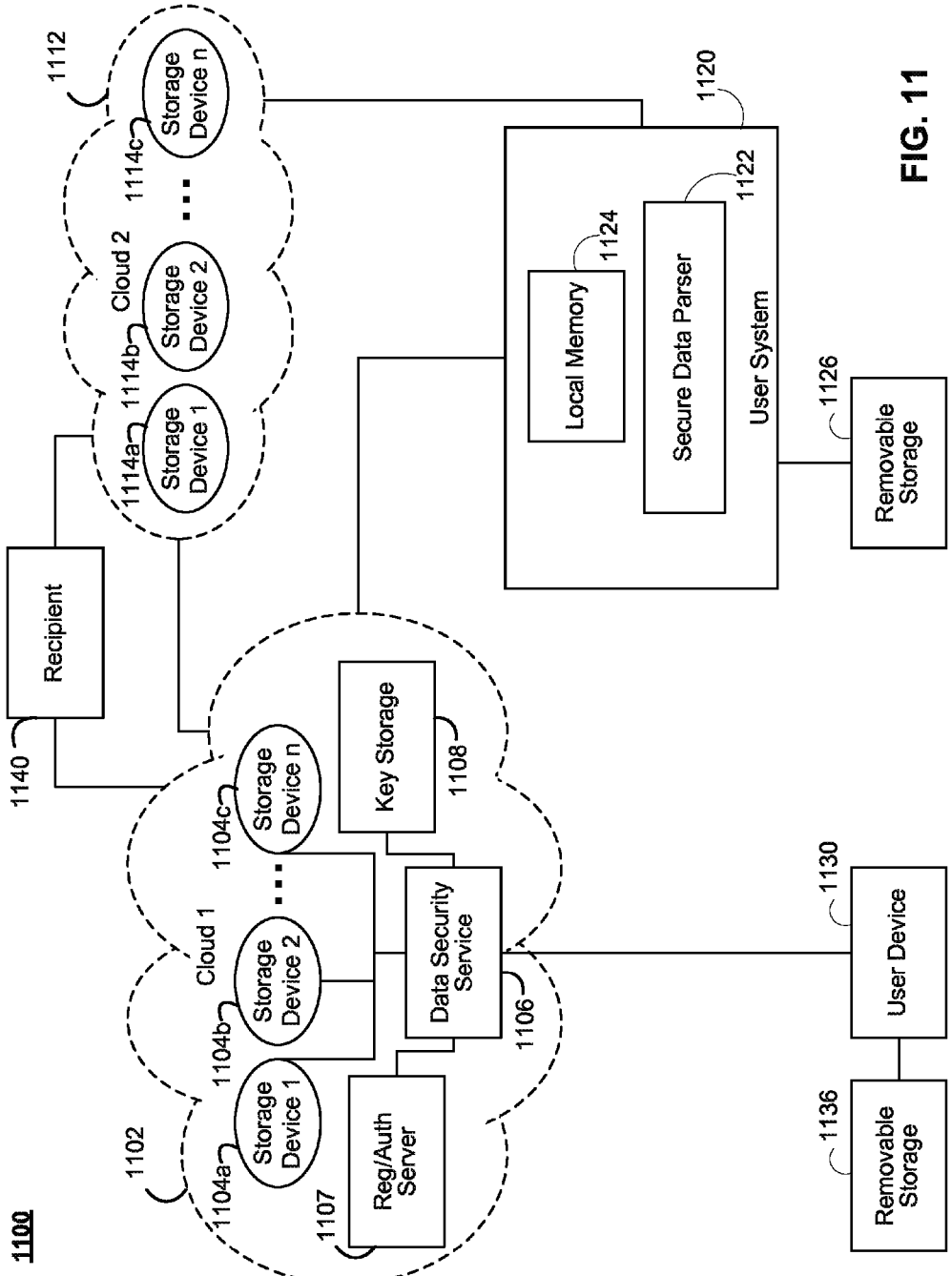
FIG. 11 is a block diagram showing several exemplary arrangements for implementing a cloud computing data security solution in accordance with an implementation.

A network 1100 showing several arrangements for using a secure data parser for implementing a cloud computing data security solution is shown in FIG. 11. The network 1100 includes two clouds, 1102 and 1112, for data and key processing and/or storage, a user system 1120 that has a local secure data parser 1122, a user device 1130 that does not have a local secure data parser, and a data recipient 1140.

User systems 1120 and 1130 are coupled to cloud 1102 which includes a number of cloud resources for storing data shares, among other functions. User systems 1120 and 1130 may include any suitable hardware, such as a computer terminal, personal computer, handheld device (e.g., PDA, Blackberry, smart phone, tablet device), cellular telephone, computer network, any other suitable hardware, or any combination thereof. User system 1120 may be configured to run a secure data parser 1122 which may be similar to the various embodiments of secure data parsers described above. The secure data parser 1122 may be integrated at any suitable level of the user system 1120. For example, secure data parser 1122 may be integrated into the hardware and/or software of user system 1120 at a sufficiently back-end level such that the presence of secure data parser 1122 may be substantially transparent to an end user of user system 1120. A recipient 1140 may be similarly coupled to cloud 1102 to access data stored by another user.

In some embodiments a user system, such as user device 1130, may not be configured to run a secure data parser, such as data parser 1122, but instead may access an external data parser that may reside on a network, for example, in data security service 1106 in cloud 1102. Cloud 1102 may include multiple illustrative cloud resources, such as data security service 1106, registration/authentication server 1107, and key storage 1108. The data security service 1106 may be used to perform operations on received data such as parsing, encrypting, and storing data, and may interface with other cloud resources. Registration/authentication server 1107 may be used to register and authenticate users of a secure storage system. Various functions of the reg/auth server 1107 are described in further detail below. Key storage 1108 may comprise one or more servers or other storage devices used to store keys such as shared keys or workgroup keys external to user system and in a different physical location from where the data is stored. A user device or user system may access these keys by communicating directly with the key storage 1108 or through the data security service 1106. Cloud 1102 also has n networked storage devices 1104a through 1104n. The cloud resources may be provided by a plurality of cloud resource providers, e.g., Amazon, Google, or Dropbox. These cloud computing resources are merely illustrative, and any suitable number and type of cloud computing resources may be accessible from user systems 1120 and 1130.

Registration/authentication server 1107 may include one or more processors configured to register users of a secure storage system such as user of secure data parser 1122, users of data security service 1106, and recipient users 1140 (which may also be users of data security service 1106). The users may include individual users, user devices, and groups of users or devices. The reg/auth server 1107 may be further configured to store user credentials such as e-mail addresses or usernames, authenticate users (e.g., based on the stored credentials), look up users by their e-mail address or other credentials, transmit a public key to a cryptographic sharing client, de-authorize one or more users from accessing the registration/authentication server 1107. The registration/authentication server 1107 may also direct users or user devices to one or more of the storage locations 1104 for writing data or for retrieving data. In particular, if data that a user device requests to retrieve has been parsed in accordance with an M of N technique (one in which M shares of N shares are needed to reassemble or restore a data set to its original or useable form, with M less than N), the registration/authentication server 1107 may identify and return to the user device information about M recommended storage locations from among the storage locations 1104a-1104n. The user device can then use this information to selectively access storage locations to retrieve the desired data.

Cloud 1102 and one or more user devices or systems, such as user system 1120, may be in communication with a second cloud 1112. Cloud 1112 includes a plurality of storage devices 1114a-1114n and may include any other cloud resources, such as the cloud resources described in relation to cloud 1102. In some embodiments, Cloud 1102 may be a public cloud (such as Amazon, Google, or Dropbox), and cloud 1112 may be a private cloud, or vice versa. In other embodiments, cloud 1102 and cloud 1112 may be different public clouds (e.g., Cloud 1102 may be provided by Amazon and Cloud 1112 may be provided by Google). Storing data shares and/or key shares across different clouds may provide enhanced data security. In addition to storing data in the cloud, one or more data shares, key shares, or keys may be stored on local storage, such as local memory 1124 of user system 1120 or a local memory of user device 1130, and one or more data shares, key shares, or keys may be stored on removable storage (e.g., a USB memory), such as removable storage 1126 or removable storage 1136 which may be for example. Any suitable number of clouds can be used. For example, in some embodiments, Cloud 1102 and cloud 1112 may form a single cloud, or only one of clouds 1102 and 1112 may be used. In some embodiments, three or more clouds may be used.

The removable storage 1126 or 1136 may be, for example, a compact USB flash drive, a floppy disk, an optical disk, or a smart card. In some embodiments, removable storage 1126 or 1136 may be used to authenticate the identity of a remote user who wishes to view, encrypt, or decrypt data that is managed by data security service 1106. In some embodiments, removable storage 1126 or 1136 may be required to initiate the encryption, decryption, or parsing of data by data security service 1106. In such embodiments, the removable storage 1126 or 1136 may be considered a physical token. An authorized recipient 1140 may also access removable storage configured to authenticate the recipient user so that the recipient 1140 can retrieve and decrypt data which it is authorized to access.

One advantage of cloud computing is that a user (e.g., a user of user device 1130 or user system 1120) may be able to access multiple cloud computing resources without having to invest in dedicated storage hardware. The user may have the ability to dynamically control the number and type of cloud computing resources accessible to it. For example, user device 1130 or user system 1120 may be provided with on-demand storage resources in the cloud having capacities that are dynamically adjustable based on current needs. In some embodiments, one or more software applications, such as secure data parser 1122 executed on user system 1120 or an Internet web browser on user device 1130, may couple a user to cloud resources 1102. The coupling of cloud resources 1102 to user device 1130 or user system 1120 may be transparent to users such that cloud resources 1102 appear to users as local hardware resources and/or dedicated hardware resources.

Figure 12:
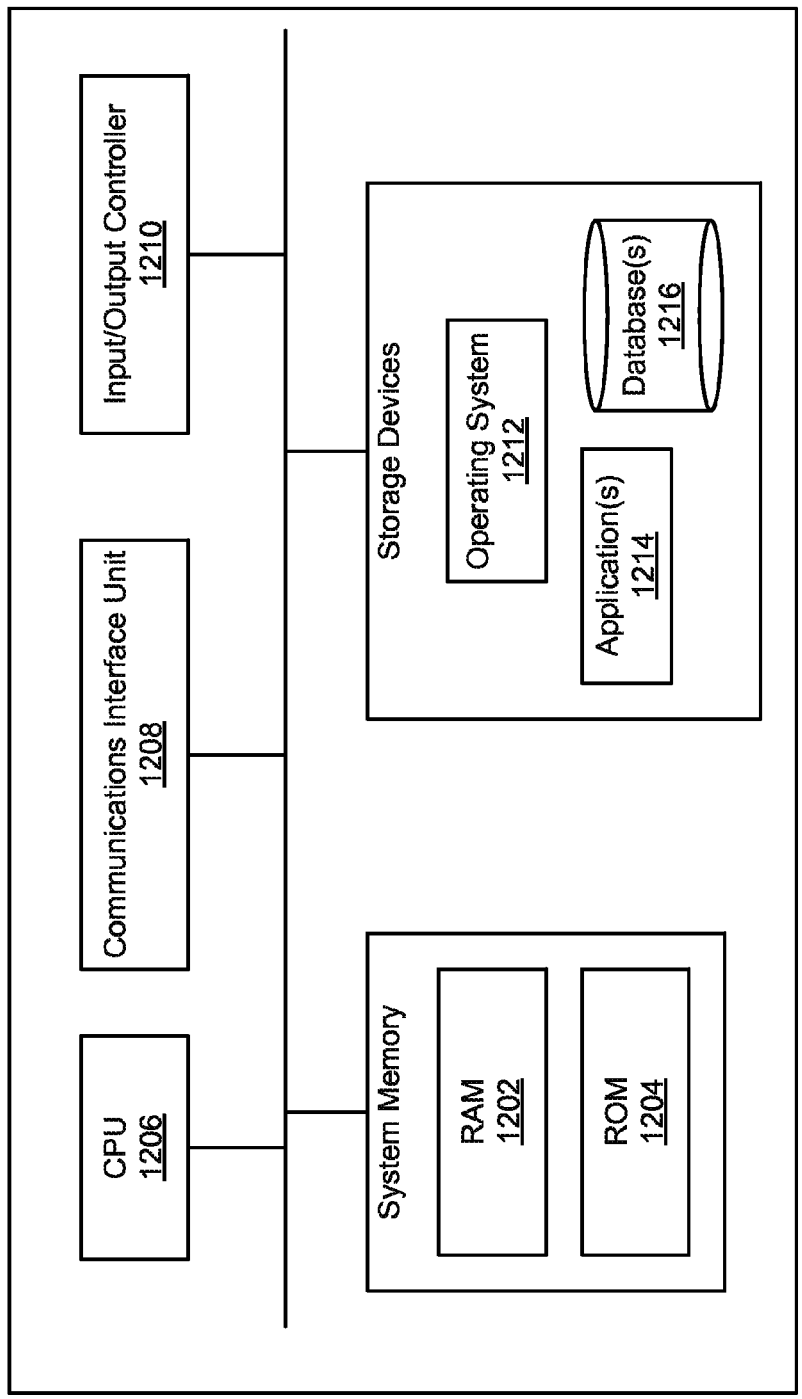
FIG. 12 is a block diagram of a computing device for performing any of the processes described herein.

FIG. 12 is a block diagram of a computing device for performing any of the processes described herein. Each of the components of these systems may be implemented on one or more computing devices 1200. In certain aspects, a plurality of the components of these systems may be included within one computing device 1200. In certain implementations, a component and a storage device may be implemented across several computing devices 1200.

The computing device 1200 comprises at least one communications interface unit, an input/output controller 1210, system memory, and one or more data storage devices. The system memory includes at least one random access memory (RAM 1202) and at least one read-only memory (ROM 1204). All of these elements are in communication with a central processing unit (CPU 1206) to facilitate the operation of the computing device 1200. The computing device 1200 may be configured in many different ways. For example, the computing device 1200 may be a conventional standalone computer or alternatively, the functions of computing device 1200 may be distributed across multiple computer systems and architectures. In FIG. 12, the computing device 1200 is linked, via network or local network, to other servers or systems.

The computing device 1200 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 1208 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 1206 comprises a processor, such as one or more conventional microprocessors and one or more supplementary co-processors such as math co-processors for offloading workload from the CPU 1206. The CPU 1206 is in communication with the communications interface unit 1208 and the input/output controller 1210, through which the CPU 1206 communicates with other devices such as other servers, user terminals, or devices. The communications interface unit 1208 and the input/output controller 1210 may include multiple communication channels for simultaneous communication with, for example, other processors, servers or client terminals.

The CPU 1206 is also in communication with the data storage device. The data storage device may comprise an appropriate combination of magnetic, optical or semiconductor memory, and may include, for example, RAM 1202, ROM 1204, flash drive, an optical disc such as a compact disc or a hard disk or drive. The CPU 1206 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 1206 may be connected to the data storage device via the communications interface unit 1208. The CPU 1206 may be configured to perform one or more particular processing functions.

The data storage device may store, for example, (i) an operating system 1212 for the computing device 1200; (ii) one or more applications 1214 (e.g., computer program code or a computer program product) adapted to direct the CPU 1206 in accordance with the systems and methods described here, and particularly in accordance with the processes described in detail with regard to the CPU 1206; or (iii) database(s) 1216 adapted to store information that may be utilized to store information required by the program.

The operating system 1212 and applications 1214 may be stored, for example, in a compressed, an uncompiled and an encrypted format, and may include computer program code. The instructions of the program may be read into a main memory of the processor from a computer-readable medium other than the data storage device, such as from the ROM 1204 or from the RAM 1202. While execution of sequences of instructions in the program causes the CPU 1206 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to vehicle routing and motion planning as described herein. The program also may include program elements such as an operating system 1212, a database management system and "device drivers" that allow the processor to interface with computer peripheral devices (e.g., a video display, a keyboard, a computer mouse, etc.) via the input/output controller 1210.

The term "computer-readable medium" as used herein refers to any non-transitory medium that provides or participates in providing instructions to the processor of the computing device 1200 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 1206 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 1200 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

The secure data parsing techniques described herein may be applied to data access using virtual machines, and in particular, to communication between a virtual machine and one or more servers or end users. Systems and methods for providing additional security features within virtual machine computing environments that integrate virtual machine and host machine security operations are described in detail in U.S. patent application Ser. No. 13/212,360, filed Aug. 18, 2011, which is hereby incorporated herein by reference in its entirety.

The parsing, encrypting, storing, and restoring processes described above may, in some implementations, be employed in virtual machine environments for securing the operation and storage of virtual machine instances. In particular, these processes may be used to secure a virtual machine at rest, ensuring that the virtual machine is not tampered with prior to restart. A number of systems and techniques for securing virtual machines are described herein, any of which may be used in combination with any of the additional security techniques described herein.

Figure 13:
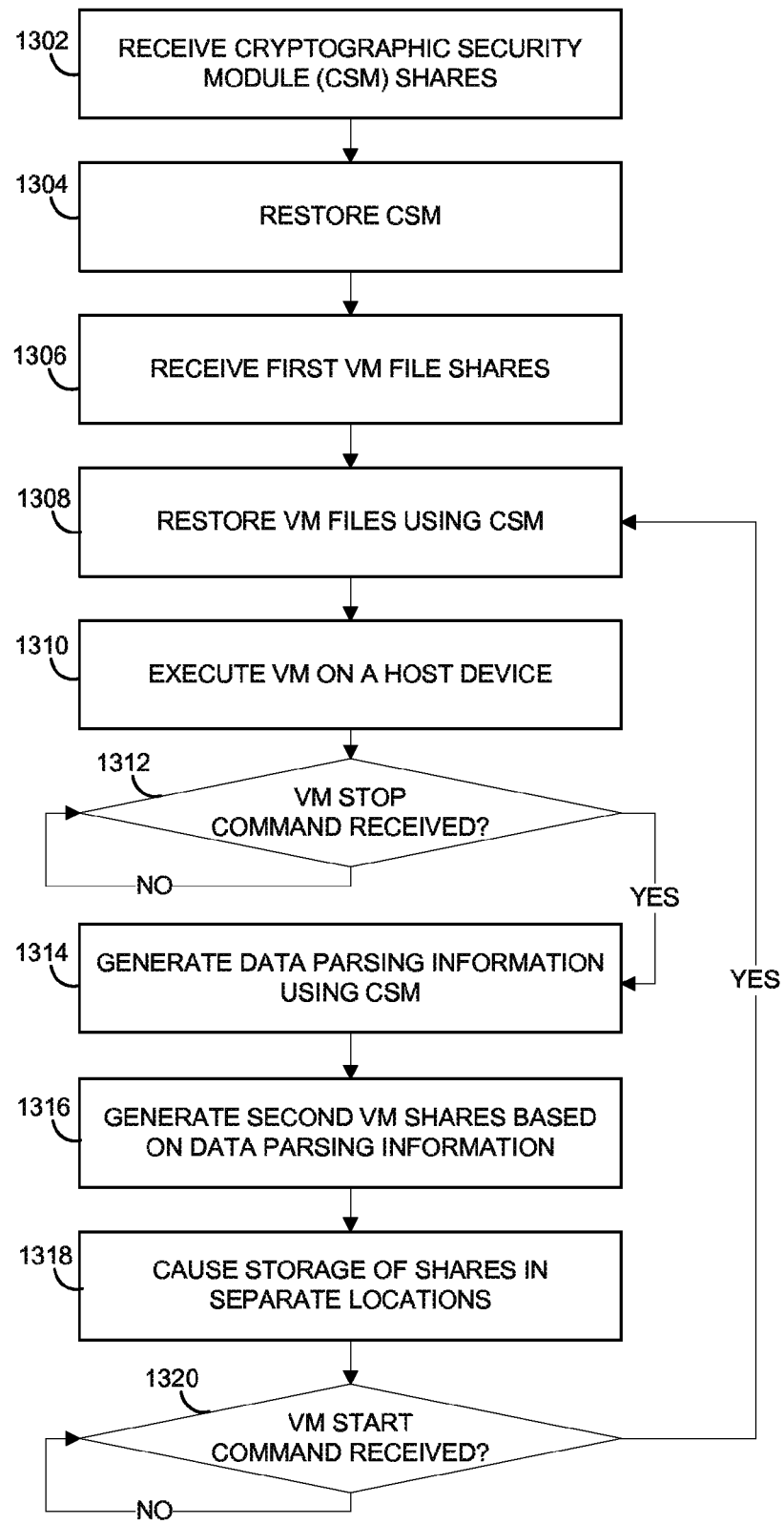
FIG. 13 is a flow diagram of a process for securing a virtual machine (VM) in accordance with one implementation.

FIG. 13 is a flow diagram 1300 of a process for securing a virtual machine. The steps of the flow diagram 1300 may be implemented by a programmed computer system, which may include one or more processors, storage devices and communication devices, arranged locally and/or remotely to one another, programmed with machine-readable instructions (such as code in any of a number of programming languages) instantiated in a computer-readable medium or a custom-configured logic device. For ease of illustration, the steps of the flow diagram 1300 are described herein as performed by a host device of a programmed computer system, but it will be understood that any one or more processing devices may be configured to carry out these steps as appropriate. In some implementations, the host device is a personal computer, a server, or a mainframe, for example. In some implementations, the host device is a portable computing device, such as a tablet device, net book, laptop, mobile telephone, smartphone, or any other such device. In some implementations, the host device includes multiple computing devices, such as any of those described above. The multiple computing devices may be configured to each execute one or more steps or operations of the process of FIG. 13 (e.g., in a serial or parallel fashion). The host device may be running an operating system such as Windows (Microsoft), Linux, MacOS (Apple), Android (Google), iOS (Cisco Systems), Blackberry OS (Research In Motion), Symbian (Nokia), or Windows Phone (Microsoft), for example.

At step 1302, the host device receives a plurality of cryptographic security module (CSM) data shares. Each of these shares is representative of a portion of the data necessary to provide an executable CSM configured to perform any one or more of the security operations described herein (such as the parsing and restoration of parsed data shares). In particular, the CSM is configured to generate data parsing information that is usable to determine into which of a plurality of shares a unit of data of a specified data set will be placed and how the unit of data will be encrypted. Examples of data parsing information are discussed below. In some implementations, the plurality of CSM data shares is received from one or more devices remote from the host device via a communication network (e.g., one or more data servers in communication with the host device via the Internet or an intranet). As used herein, the term "network" includes ad hoc networks, peer-to-peer networks and near-field networks. The CSM data shares may be transmitted to the host device on a schedule (e.g., every twenty-four hours) or in response to a request from the host device (as discussed in detail below).

The CSM data shares may be generated using any of the techniques described herein for generating data shares, such as deterministic and random techniques. The particular share generation technique selected should be complementary to the restoration techniques available to the host device to ensure that the CSM can be properly restored from the CSM data shares. In some implementations, the technique used to restore the CSM from the CSM data shares is stored in and executable by the host device. This technique may be a simpler restoration technique than can be performed by the CSM, such as a simple deterministic technique wherein the CSM shares are combined in a predetermined order to form an executable CSM or an installer for an executable CSM. In some implementations, the technique used to restore the CSM from the CSM data shares is specified by the CSM data shares or in a data file accompanying the CSM data shares, and is executable by the host device. In such implementations, a measure of security is provided by separating the CSM data shares from each other, even though the technique for restoring the CSM from the CSM data shares may be obtained. Encrypting the restoration technique instructions may provide an additional level of security.

At step 1304, the host device restores the CSM from the CSM data shares, in accordance with the appropriate restoration technique as described herein. If the restoration of the CSM data shares provides a CSM installer, the host device may execute the installer after restoration to obtain the executable CSM. In some implementations, only a single CSM data share is received at step 1302; the remaining data necessary for the restoration of the CSM is already available to the host device (e.g., stored locally). In some implementations, the host device receives the CSM or CSM installer "whole" at step 1302, in which case the restoration of the CSM from CSM data shares of step 1304 may be performed by storing the CSM or installing the CSM, for example. In some implementations, the host device does not perform steps 1302 and 1304; instead, the executable CSM is available to the host device (e.g., stored in local or remotely accessible storage), and thus the CSM need not be restored from data shares.

At step 1306, the host device receives a plurality of first virtual machine (VM) shares. These shares may be received from one or more devices remote from the host device (e.g., remote servers), one or more local devices, or a combination thereof. Each of these shares represents a portion of one or more VM files that are used to instantiate and run a VM on the host device. For example, the first VM shares received at step 1305 may represent one or more of a log file, a virtual machine BIOS status file, a virtual disk file, a paging file, a snapshot state file, a suspended state file, and a configuration file. The VM files represented by the first VM shares received at step 1306 may depend on the VM application through which the VM will operate. Examples of commercially available VM applications include VMware (VMWare, Inc.), Xen, and Hyper-V (Microsoft), but any other application-level, operating system-level or hardware-level VM application may be used. These VM files may be processed in any manner described herein with reference to any data set, and in particular, the first VM shares may be generated using any of the techniques described herein for generating data shares, such as deterministic and random techniques, as long as the CSM at the host device can restore the VM from the first VM shares.

At step 1308, the host device restores the VM files from the first VM shares using data restoring information generated by the CSM. For example, the data restoring information may instruct the CSM to restore the VM files from the first VM shares by first decrypting each first VM share and then combining the first VM shares. One or more encryption/decryption keys may be stored with or separately from the first VM shares and may themselves be parsed into shares (e.g., applying a Shamir technique). In some implementations, the data restoring information instructs the CSM to first combine the VM shares and then decrypt the combination to restore the VM. The data restoring information may specify any of a number of decrypting and combining steps, or any other data restoration techniques described herein. In some implementations, only a single first VM share is received at step 1306; the remaining data necessary for the restoration of the VM files is already available to the host device (e.g., stored locally). In some implementations, the host device receives the VM files "whole" at step 1306, in which case the restoration of the VM files at step 1308 may be performed by storing the VM files or extracting the VM file s from a compressed file format (e.g., a ZIP file), for example. In some implementations, the host device does not perform steps 1306 and 1308; instead, a VM application residing on the host devices generates a new VM instance without needing to access existing VM shares.

At step 1310, the host device executes the VM using the VM files restored at step 1308. The VM may be any VM configured to perform any function, such as communications functions, data processing functions, and gaming functions. For example, the VM may be a guest operating system (OS) supported by a user's employer. The employer may control the configuration of the VM to ensure that none of the processes and applications native to the host device can infect or contaminate the operation of the guest OS. Use of a VM in this context allows a user to interact with a single device to perform both personal computing tasks (through the native OS) and work-related computing tasks (through the guest OS), but many other uses for VMs are known and may be used in connection with this and other suitable implementations.

At step 1312, the host device determines whether a command to stop the VM has been received. As used herein, a "stop command" refers to any command that triggers the storage of one or more VM files associated with the VM, such as a save command, a shut down command, a suspend command, and a pause command. The one or more VM files to be stored in response to a stop command may have changed since the files were restored at step 1308 because of any changes to the VM or additional information generated since the VM was executed at step 1310. In some implementations, the stop command is issued by a user of the host device (e.g., when the user desires to switch from a guest OS run by the VM to the native OS). In some implementations, the stop command is issued by the host device or another device without a substantially contemporaneous command from a user (e.g., at a predetermined "autosave" time, in response to an interrupt event, etc.). If no stop command is received at step 1312, the host device continues to monitor for a stop command.

If a stop command is identified at step 1312, the host device proceeds to invoke the CSM to generate data parsing information for generating shares of the VM files at step 1314. The activity of the VM may be stopped for some or all of the time during which the VM files are being securely stored (e.g., steps 1314-1318). The data parsing information generated at step 1314 is usable to determine into which of a plurality of shares a unit of data of the virtual machine files will be placed and how the unit of data will be encrypted, as described in detail throughout this disclosure. In some implementations, the data parsing information specifies a deterministic technique for determining into which of the plurality of shares the unit of data of the virtual machine files will be placed. In some implementations, the data parsing information specifies a substantially random technique for determining into which of the plurality of shares the unit of data of the virtual machine files will be placed. Any of a number of parsing techniques may be used, and multiple parsing techniques may be layered.

At step 1316, the host device invokes the CSM to generate a plurality of second VM shares from the VM files based on the data parsing information generated at step 1314. As described above with reference to step 1302 and step 1306, the second VM shares may be generated by parsing the VM files in any of a number of ways. In some implementations, the CSM identifies a plurality of portions of the VM files and encrypts each of the plurality of portions to form the second VM shares. In some implementations, the CSM encrypts the virtual machine files and identifies a plurality of portions of the encrypted VM files to form the second VM shares. As discussed in detail throughout this disclosure, the VM files are restorable by accessing a threshold number of the second VM shares. In some implementations, the threshold number is less than a total number of the second VM shares.

At step 1318, the host device causes each of the second VM shares to be stored in respective separate storage locations. In some implementations, the separate storage locations include a plurality of separate storage locations on the host device itself, a plurality of separate storage locations on one or more devices remote from the host device, or a combination of at least one storage location on the host device and at least one storage location on a device remote from the host device. In some implementations, the storage locations at which the second VM shares are stored are the same locations as the first VM shares were stored before the first VM shares were received by the host device at step 1306.

At step 1320, the host device determines whether a VM start command has been received. As used herein, a "start command" includes any command in response to which the VM files should be restored from the second VM shares in order to execute the VM. If no start command is identified at step 1320, the host device continues to monitor for such a command. If a start command is identified at step 1320, the host device returns to step 1308 to restore the VM files from the second VM shares. In this way, a stopped VM can be securely stored by parsing the VM files, and securely restored in response to a start command, reducing the likelihood that the VM will be corrupted or tampered with while stopped.

Figure 14A:
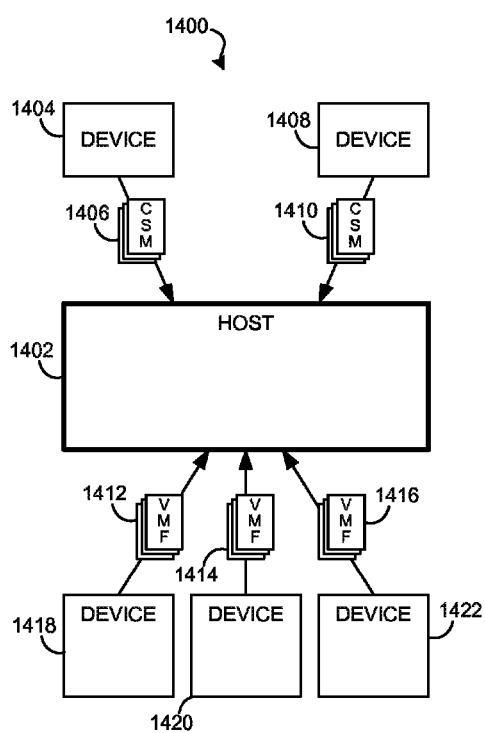
Figure 14B:
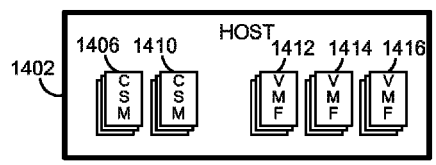

The process of FIG. 13 is illustrated by the block diagrams of a secure VM environment 1400 in FIGS. 14A-14G. In FIG. 14A, the host device 1402 receives one or more cryptographic security module (CSM) shares 1404 from a device 1406 and one or more CSM shares 1408 from a device 1410 (step 1302 of FIG. 13). The host device 1402 also receives one or more first virtual machine (VM) shares 1412, 1414 and 1416 from devices 1418, 1420 and 1422, respectively (step 1306 of FIG. 13). In some implementations, the devices 1406, 1410, 1418, 1420 and 1422 each comprise servers in wireless or wired communication with the host device 1402. FIG. 14B illustrates the CSM shares 1406 and 1410 and the first VM shares 1412, 1414 and 1416 stored locally to the host device 1402.

Figure 14C:
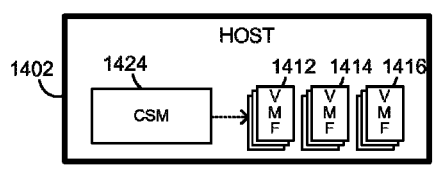
Figure 14D:
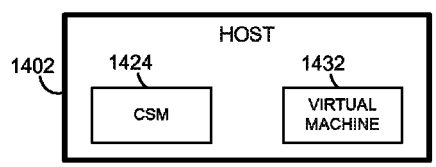
Figure 14E:
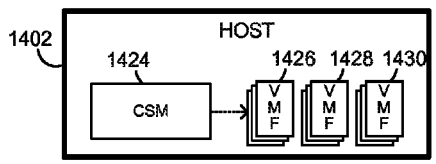

FIG. 14C illustrates a restored CSM 1424 generated from the CSM shares 1406 and 1410 (step 1304 of FIG. 13), which is used to restore the VM 1432 (FIG. 14D) from the first VM shares 1412, 1414 and 1416 (step 1308 of FIG. 13). The VM 1432 is then executed (step 1310 of FIG. 13), during which period the files underlying the VM are changed. In response to a stop command (step 1312 of FIG. 13), the host device 1404 uses the CSM 1424 to generate parsing information (step 1314 of FIG. 13) for generating a set of second VM shares 1426, 1428 and 1430 as shown in FIG. 14E (step 1316 of FIG. 13). The second VM shares 1426, 1428 and 1420 are then stored at the devices 1418, 1420 and 1422 as shown in FIG. 14F (step 1318 of FIG. 13). The host device 1402 may delete the CSM 1424, as shown in FIG. 14G, and await a command to start the VM (step 1320 of FIG. 13), at which point the host machine 1402 may retrieve the second VM shares 1426, 1428 and 1430 from the devices 1418, 1420 and 1422.

As noted herein, in some implementations, the cryptographic security module (CSM) and the virtual machine (VM) are already available to a host device, and thus steps 1302 and 1304, and steps 1306 and 1308, need not be performed. Block diagrams of a secure VM environment 1500 according to one such implementation are presented in FIGS. 15A-15B. In FIG. 15A, CSM 1524 and VM 1532 are available to the host device 1504, and thus the process of FIG. 13 may begin at step 1310, with the execution of the VM 1532. In response to a stop command (step 1312 of FIG. 13), the host device 1504 uses the CSM 1524 to generate parsing information (step 1314 of FIG. 13) for generating a set of second VM shares 1526, 1528 and 1530 as shown in FIG. 15B (step 1316 of FIG. 13). The second VM shares 1526, 1528 and 1520 may then be stored remotely (as illustrated above in FIG. 14) or locally.

In some implementations, VM shares are stored together or are otherwise organized into recognizable directories for easy access. In some implementations of the VM securing techniques described herein, VM shares are stored locally to a host device in one or more separate storage locations that are selected to make it difficult to detect the presence of VM shares on the host device. This may be achieved by storing the shares in directories associated with non-VM applications or system files, and by naming the VM shares with file names and extensions that obscure their origin. Additionally, the VM share may be further obscured by changing the file information (such are time/date created, time/date modified and the time/date accessed) using a commercially available file management program or other utility, for example.

Figure 16:
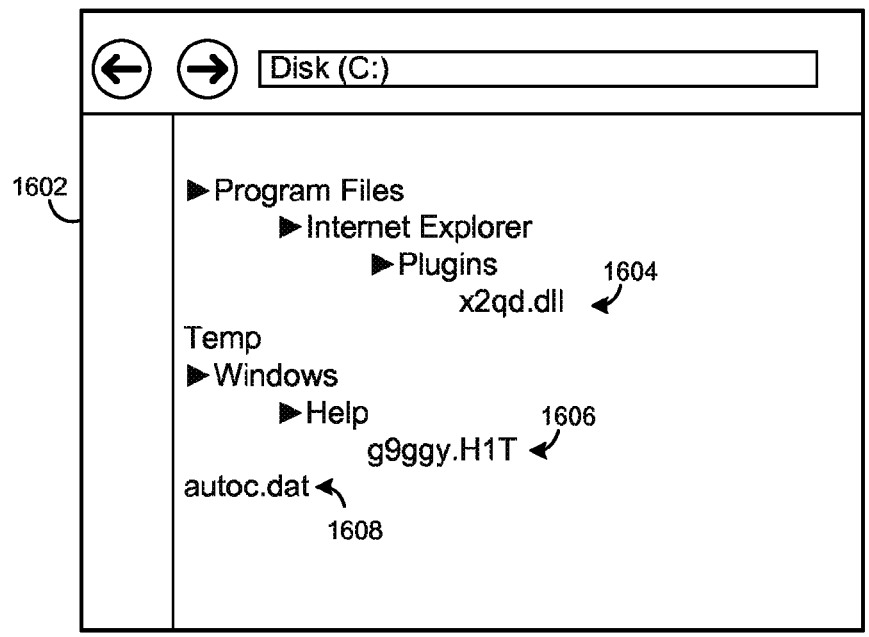
FIG. 16 depicts one example of a display including a directory structure in which VM shares are "hidden" in accordance with one implementation.

FIG. 16 depicts one example of a display 1602 including a directory structure in which VM shares are "hidden." In this example, a first VM share 1604 is stored in a "Plugins" directory for the application "Internet Explorer" and is labeled as "x2qd.dll". A second VM share 1606 is stored in a system "Help" directory as "g9ggy.H1T". A third VM share 1608 is stored in a "Program Files" directory as "autoc.dat". In such implementations, the location of the VM shares is known to the CSM so that the shares can be recovered and the VM restored upon receipt of a start command. A casual observer, however, will not readily detect the presence of a VM by inspecting the directory structure of the display 1602.

In some implementations, VM shares are stored in partition of a storage medium (such as a hard disk) that is separate from a partition managed by the operating system (OS). As a result, the VM shares are not available to nor recognized by the OS, and are thus not viewable to an observer of the OS's file system. The CSM may store the VM shares in this separate partition by writing the VM share data directly to data blocks in the separate partition, by passing the OS's file system. The CSM may store the VM shares in this separate partition by writing the VM share data directly to data blocks in the separate partition, by passing the OS's file system.

Figure 17:
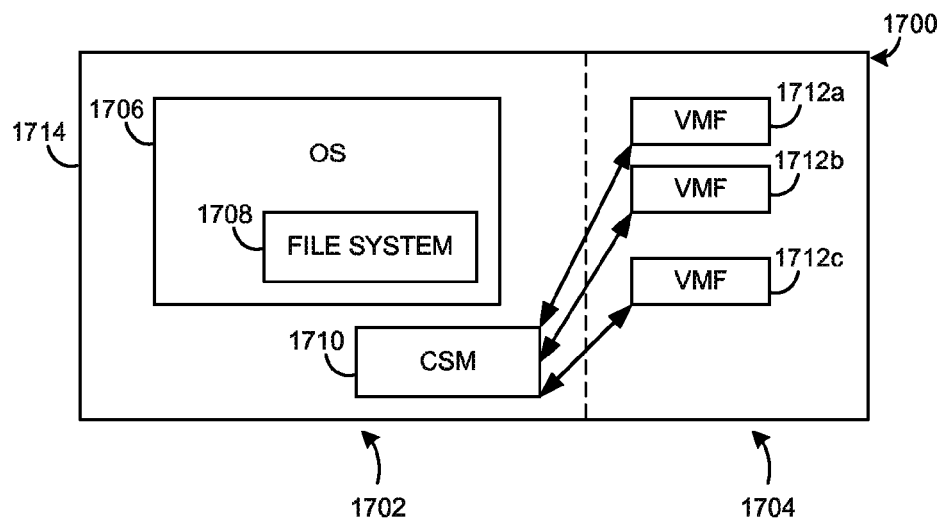
FIG. 17 depicts one example of a partitioned storage medium system used to obscure the presence of VM shares in accordance with one implementation.

FIG. 17 depicts one example of a partitioned storage medium system 1700 used to obscure the presence of VM shares. The storage medium system 1700 includes a storage medium 1714 that is partitioned into a first partition 1702 and a second partition 1704. The first partition 1702 is a portion of the data blocks of the storage medium 1714 (e.g., 196 GB of a 200 GB hard drive) that are allocated to the operating system (OS) 1706 for management by the file system 1708. The second partition 1704 may include the remaining data block s of the storage medium 1714 (e.g., 4 GB of the 200 GB hard drive). The storage medium system 1700 is configured such that the CSM 1710 (operating under the OS 1706) writes the VM shares 1712 directly to storage locations in the second partition 1704. The CSM 1710 can retrieve those shares by reading directly from the second partition 1704. Although the VM shares 1712 are accessible to the CSM 1710, the shares are not managed by the file system 1708 and thus not visible to the OS 1706.

The presence of a virtual machine or other data set may be additionally obscured to a casual observer by requiring a predetermined sequence of user inputs before an indication of the data set is displayed on the device. For example, after a stopped VM is secured by storing shares of the VM files in separate storage locations, the host device may provide no icon or drop-down menu entry with which a user can issue a command to start the VM; instead, the host device may wait for the user to perform a series of gestural inputs before the VM is started. These gestural inputs may be selected for their similarity to common gestures, e.g., tapping the host device on a surface or rubbing a touch display as if to remove a fingerprint. By having no visual indication of the presence of a data set, and by requiring a "camouflaged" gestural or other input to restore the data set, the data set is further obscured from an observer.

Figure 18:
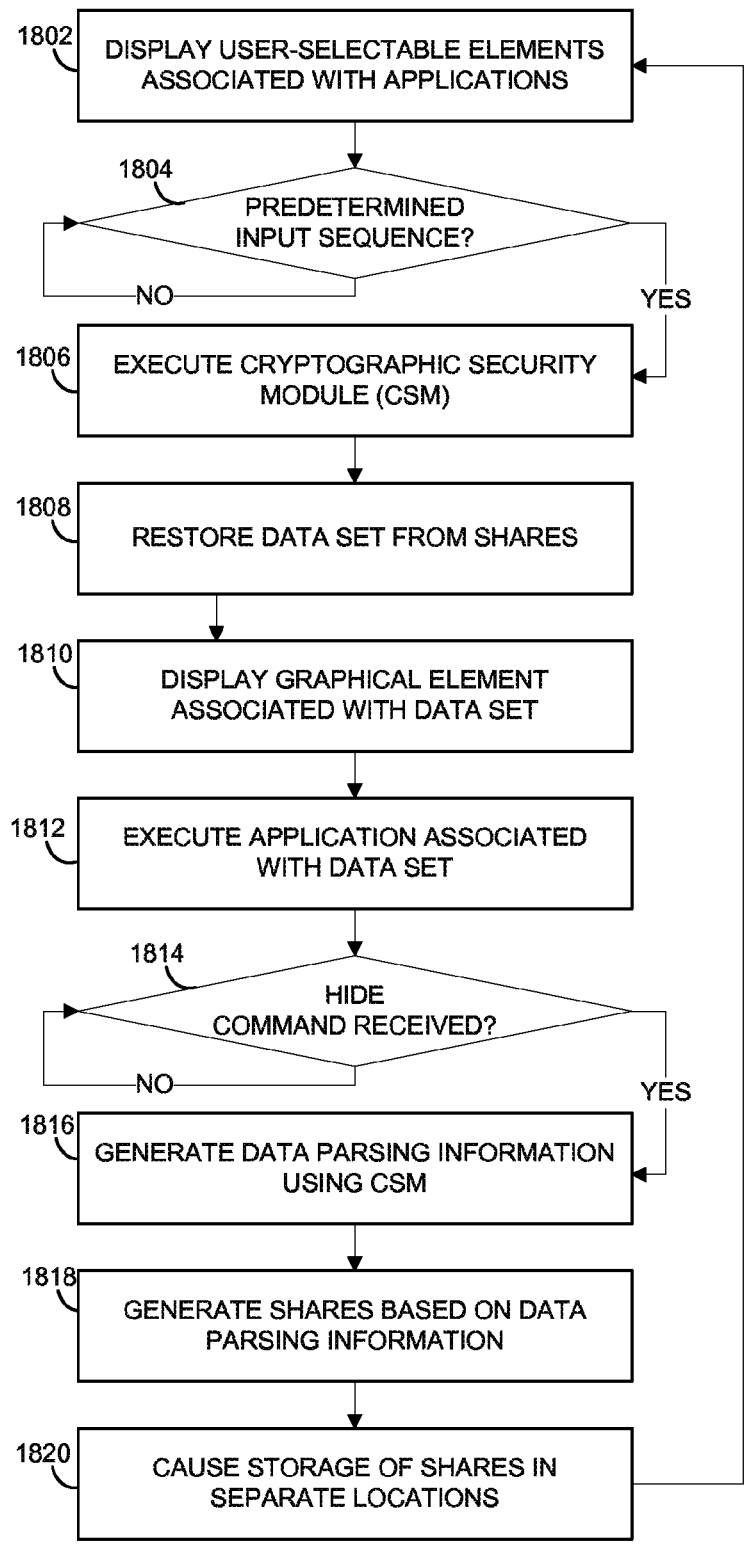
FIG. 18 is a flow diagram 1800 of a process for restoring a data set in accordance with such implementations.

FIG. 18 is a flow diagram 1800 of a process for restoring a data set in accordance with such implementations. As described above with reference to FIG. 13, the steps of the flow diagram 1800 may be implemented by a programmed computer system, which may include one or more processors, storage devices and communication devices, arranged locally and/or remotely to one another, programmed with machine-readable instructions (such as code in any of a number of programming languages) instantiated in a computer-readable medium or a custom-configured logic device. For ease of illustration, the steps of the flow diagram 1800 are described herein as performed by a processing device of a programmed computer system, but it will be understood that any one or more processing devices may be configured to carry out these steps as appropriate. In some implementations, the processing device is a personal computer, a server, or a mainframe, for example. In some implementations, the processing device is a portable computing device, such as a tablet device, net book, laptop, mobile telephone, smartphone, or any other such device. In some implementations, the processing device includes multiple computing devices, such as any of those described herein. The multiple computing devices may be configured to each execute one or more steps or operations of the process of FIG. 18 (e.g., in a serial or parallel fashion). The processing device may be running an operating system such as Windows (Microsoft), Linux, MacOS (Apple), Android (Google), iOS (Cisco Systems), Blackberry OS (Research In Motion), Symbian (Nokia), or Windows Phone (Microsoft), for example.

At step 1802, the processing device displays a plurality of user-selectable elements on a display device. Each user-selectable element is associated with a different executable application, such as a browser application or a word processing application. The user-selectable elements may include one or more icons, one or more drop-down menu listings, or any other selectable display element.

At step 1804, while the plurality of user-selectable elements is displayed, the processing device determines whether a predetermined sequence of user inputs have been received. The predetermined sequence of user inputs may include any one or more of a gestural input (e.g., a particular shape drawn on a touchpad with a stylus or finger), a biometric recognition input (e.g., a face recognition input, a fingerprint recognition input, a retinal scan input), an orientation of the processing device (e.g., holding the device upside down for a predetermined period of time), and an acceleration of the processing device (e.g., tapping the device on a surface a predetermined number of times, or at a predetermined rate, or waving the device in a predetermined manner), a keypad input (e.g., a passcode or other sequence of key presses). If the processing device does not identify the predetermined sequence of user inputs, the processing devices continues to monitor for the inputs.

If the processing device does identify the predetermined sequence of user inputs at step 1804, the processing device executes a cryptographic security module (CSM) at step 1806. The CSM is configured to restore data sets from data set shares, and is not associated with any of the user-selectable elements displayed at step 1802 (prior to receiving the predetermined sequence of user inputs). In other words, the presence of the CSM was not apparent to an observer by visual inspection of the display device at step 1802.

At step 1808, the processing device using the cryptographic restoration functionality of the CSM to restore a data set associated with the predetermined sequence of user inputs from a plurality of data set shares, each data set share representative of an encrypted portion of the data set. Techniques for generating data shares and restoring those data shares are described in detail throughout this disclosure. The data set shares may be stored in respective separate storage locations local to the processing device, remote to the processing device, or a combination thereof.

At step 1810, the processing device displays a graphical element associated with the data set on the display device. The graphical element may be an icon or other indicator that signals to the user of the processing device that the data set has been restored. In some implementations, this graphical element is a visual representation of the data set itself. This display step is optional; in some implementations, no visual indication of the restored data set is presented. However, the processing device may utilize any additional functionality provided by the restored data set, or make any such additional functionality available to the user. For example, the data set restored at step 1808 may be an executed mobile telephone application (or virtual machine running such an application) that allows a user to make calls from "hidden" telephone within a smartphone with an existing "apparent" telephone application. The presence of the hidden telephone may be visually indicated to provide additional security.

In some implementations, the data set is associated with an application executable by the processing device. In such implementations, the processing device may optionally perform step 1812 and execute the associated application. For example, the data set may be an installer for a telephonic communication application or may provide configuration data for such an application. In another example, the data set may be representative of virtual machine files, such as log file, a virtual machine BIOS status file, a virtual disk file, a paging file, a snapshot state file, a suspended state file, and a configuration file. When the data set is representative of virtual machine files, executing the associated application may include starting a virtual machine using the virtual machine files.

At step 1814, the processing device determines whether a hide command has been received. As used herein, a "hide command" is any command that indicates that the presence of the data set should be obscured from an observer. A hide command may include any of the step commands described above with reference to FIG. 13, for example, or may include commands to hibernate, sleep, lock, or suspend the processing device. If no hide command is received at step 1814, the processing device continues to monitor for such a command. A user may issue a hide command by using a predetermined sequence of user inputs (including any of the user inputs discussed above with reference to step 1804) or a single designated input. A hide command may also be automatically generated when the processing devices detects certain conditions, such as the electrical signature of an enemy craft in a conflict scenario.

If a hide command is received at step 1814, the processing device obscures the data set by generating data parsing information using the CSM (step 1816), generating shares of the data set based on the data parsing information (step 1818) and causing storage of the shares in respective separate locations (step 1820). These steps may be performed in any of the ways described herein (e.g., those described above with reference to FIG. 13).

FIGS. 19A and 19B depict displays on a portable device that may be presented before and after the predetermined sequence of user inputs is identified at step 1804 of FIG. 18. FIG. 19A depicts a display 1902 with three user-selectable icons 1904, 1906 and 1908, which may be associated with music, browsing and chat applications, respectively. None of the user-selectable icons 1904, 1906 and 1908 are associated with a cryptographic security module (CSM) or a data set stored in shares and obscured on the portable device. After the predetermined sequence of user inputs is identified at step 1804 of FIG. 18, the additional graphical element 1910 is displayed, indicating that the data set has been restored. The graphical element 1910 may be user-selectable to trigger the display of the data set or the launch of an application associated with the data set.

In some of the virtual machine security and data restoration techniques described above, a device receives one or more shares from one or more other devices before a cryptographic security module (CSM), a virtual machine (VM) or a data set is restored. The ability to receive shares only when two devices are in "proximity" may have a number of advantages for certain applications. For example, a company may only wish to allow its employees to access a sensitive data site when the employees are within the company's facilities. In another example, a news informant may wish to exchange data with a journalist when the two are in proximity, but not until then. In another example, a developer of a multi-player game for handheld devices may wish to only allow users to access new game levels when a sufficient number of them have come into geographical proximity. In any of these settings, access to resources may be controlled by only providing sufficient data shares to restore a desired resource (or access to a desired resource) when the proximity conditions are met.

Figure 20:
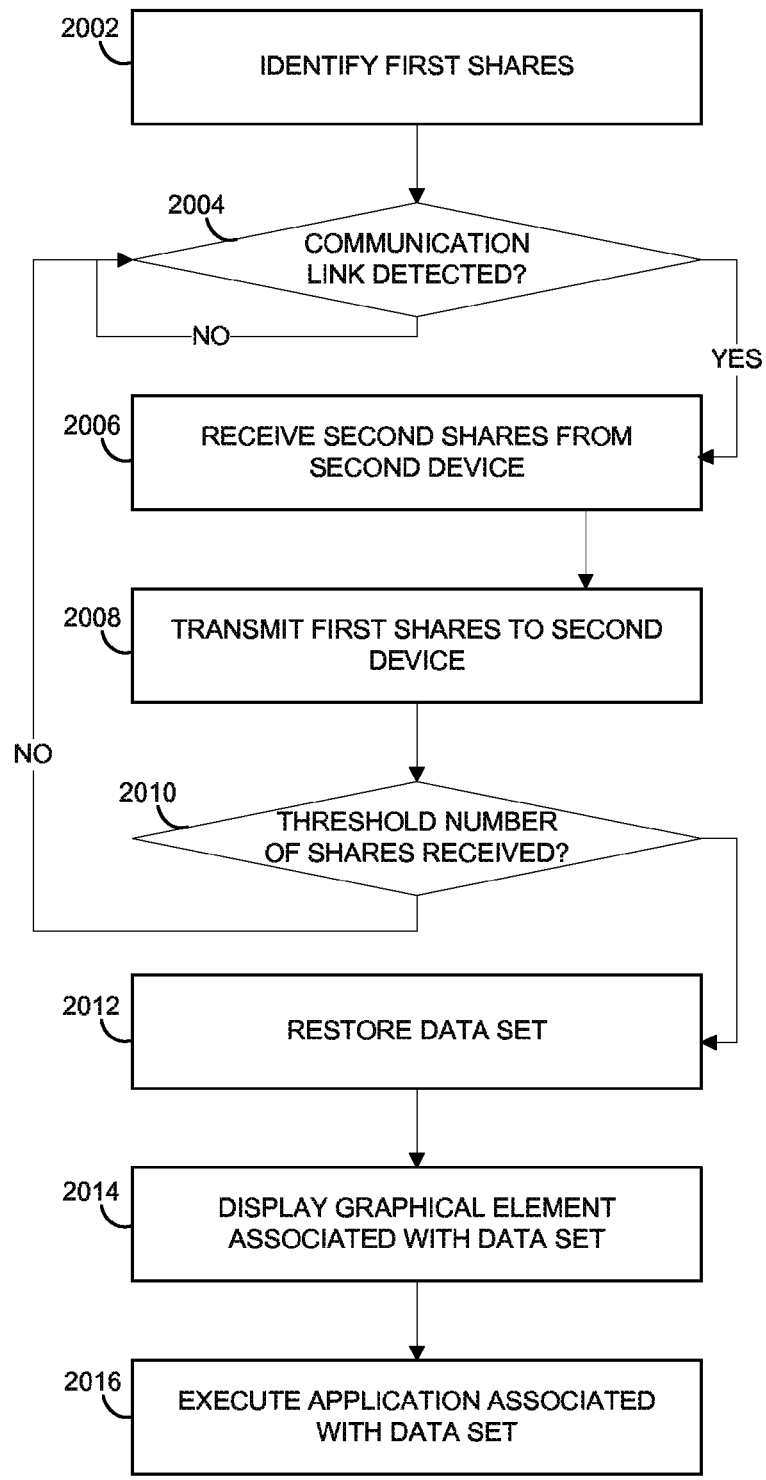
FIG. 20 is a flow diagram of a process for restoring a data set in accordance with one implementation.

FIG. 20 is a flow diagram 2000 of such a process for restoring a data set. As described above with reference to FIGS. 13 and 18, the steps of the flow diagram 2000 may be implemented by a programmed computer system, which may include one or more processors, storage devices and communication devices, arranged locally and/or remotely to one another, programmed with machine-readable instructions (such as code in any of a number of programming languages) instantiated in a computer-readable medium or a custom-configured logic device. For ease of illustration, the steps of the flow diagram 1800 are described herein as performed by a first computer device of a programmed computer system, but it will be understood that any one or more processing devices may be configured to carry out these steps as appropriate. In some implementations, the firs computer device is a personal computer, a server, or a mainframe, for example. In some implementations, the first computer device is a portable computing device, such as a tablet device, net book, laptop, mobile telephone, smartphone, or any other such device. In some implementations, the first computer device includes multiple computing devices, such as any of those described above. The multiple computing devices may be configured to each execute one or more steps or operations of the process of FIG. 13 (e.g., in a serial or parallel fashion). The first computer device may be running an operating system such as Windows (Microsoft), Linux, MacOS (Apple), Android (Google), iOS (Cisco Systems), Blackberry OS (Research In Motion), Symbian (Nokia), or Windows Phone (Microsoft), for example.

At step 2002, the first computer device identifies first data set shares available to the processing device. Each first data set share is representative of a portion of data from a desired data set. The data set cannot be restored from the first identified data set shares but can be restored by a threshold number of data set shares. In some implementations, the first data set shares are stored locally to the first computer device.

At step 2004, the first computer device determines whether a communication link is detected between the first computer device and a second computer device different from the first computer device. The second computer device may be a handheld computer device, a server, a laptop, or any other computer device. In some implementations, detecting a communication link at step 2004 includes determining that the second computer device is within a communication range of a radio frequency communication device (such as a Bluetooth device) of the first computer device. In some implementations, detecting a communication link at step 2004 includes determining that the second computer device is connected to a computer communications network to which the first computer device is also connected. This connection may be wired or wireless. In some implementations, detecting a communication link at step 2004 includes determining that the second computer device is within a predetermined geographical distance of the first computer device. This geographical determination may be made, for example, by receiving information at the first computer device from a server configured to store information about the geographical location of the second computer device (e.g., GPS tracking) The information from the server may be a message indicating a proximity of the second computer device to the first computer device. In some embodiments, detecting a communication link at step 2004 includes detecting an electrical communication pathway between the first computer device and the second computer device via a body of a user of the first computer device and a body of a user of the second computer device, the bodies of the users in physical contact with each other and with their respective computer devices. Examples of these various implementations of step 2004 are described below with reference to FIGS. 21-69.

If no communication link is detected at step 2004, the first computer device continues to monitor for a communication link. If a communication link is detected at step 2004, the first computer device receives second data set shares from the second computer device at step 2006 The first computer device may also transmit the first data set shares to the second computer device at step 2008. In some implementations, the receiving of step 2006 and the transmitting of step 2008 occur via the detected communication link. In some implementations, the receiving of step 2006 and the transmitting of step 2008 occur via a proxy device, such as a server in communication with both the first computer device and the second computer device.

At step 2010, the first computer device determines whether the threshold number of shares has been received to restore the desired data set. If not, the first computer device returns to step 2004 to monitor for a communication link with another computer device. If the threshold number of shares has been received at step 2010, the first computer device restores the desired data set from the shares at step 2012 (using, for example, a cryptographic security module configured to perform any of the restoration techniques described herein).

combination thereof.

At step 2014, the processing device displays a graphical element associated with the data set on the display device. The graphical element may be an icon or other indicator that signals to the user of the processing device that the data set has been restored. In some implementations, this graphical element is a visual representation of the data set itself. This display step is optional; in some implementations, no visual indication of the restored data set is presented. However, the first computer device may utilize any additional functionality provided by the restored data set, or make any such additional functionality available to a user, a discussed above with reference to step 1810 of FIG. 18.

In some implementations, the data set is associated with an application executable by the processing device. In such implementations, the processing device may optionally perform step 2016 and execute the associated application. For example, the data set may be an installer for a telephonic communication application or may provide configuration data for such an application. In another example, the data set may be associated with a gaming application. In another example, the data set may be representative of virtual machine files, such as log file, a virtual machine BIOS status file, a virtual disk file, a paging file, a snapshot state file, a suspended state file, and a configuration file. When the data set is representative of virtual machine files, executing the associated application may include starting a virtual machine using the virtual machine files.

FIGS. 21A and 21B illustrate one implementation of steps 2002-2006 of FIG. 20. FIG. 21A depicts a first computer device 2102 that has access to first data set shares S1 2104 and a server 2106 that has access to second data set shares S2 2108. In FIG. 21B, when the first computer device 2102 connects to the server 2106 via a wired connection (e.g., by docking the first computer device 2102 in a docking station wired to a common communication network with server 2106), the first computer device 2102 receives the second data set shares S2 2108 from the server 2106.

FIGS. 22A and 22B illustrate another implementation of steps 2002-2006 of FIG. 20. FIG. 22A depicts a first computer device 2202 that has access to first data set shares S1 2204 and a server 2206 that has access to second data set shares S2 2208. In FIG. 22B, when the first computer device 2202 enters a wireless connection range 2210 of the server 2206 and connects to the server 2206 via a wireless connection (e.g., an 802.11b or Bluetooth connection), the first computer device 2202 receives the second data set shares S2 2208 from the server 2206.

Figure 23A:
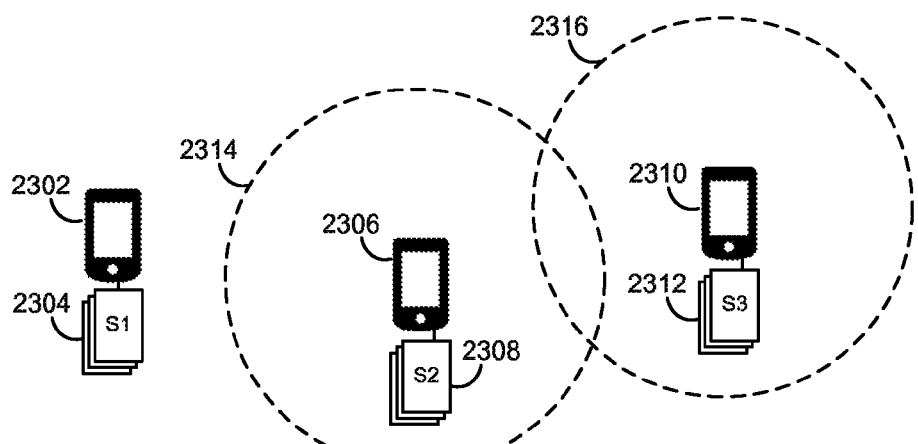
FIGS. 23A-23C illustrate another implementation of some of the steps of FIG. 20.
Figure 23B:
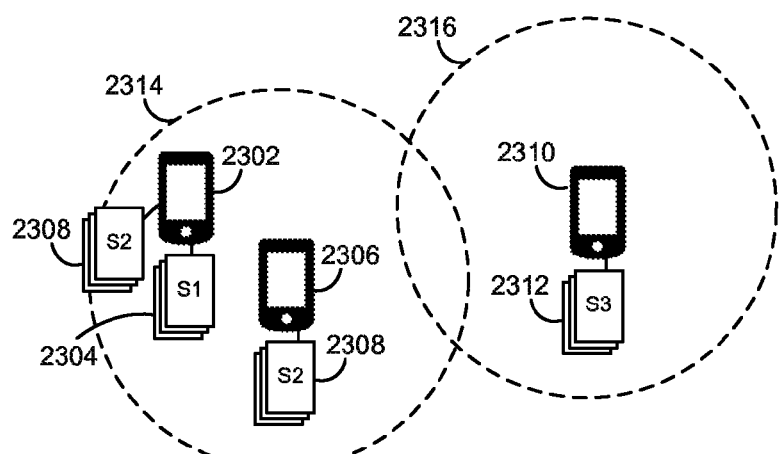
Figure 23C:
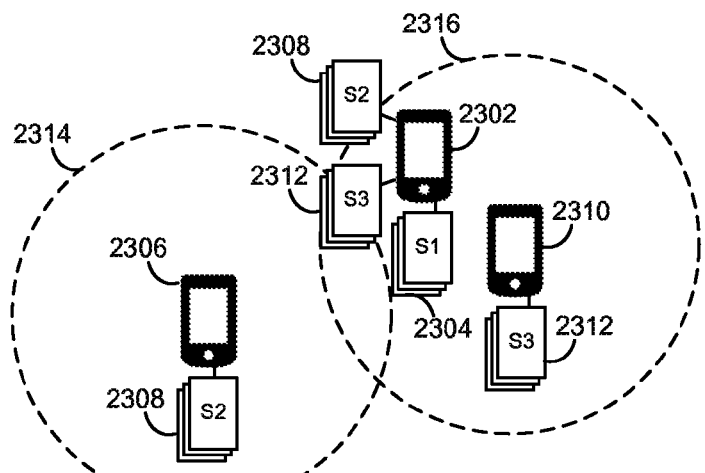

FIGS. 23A-23C illustrate another implementation of several of the steps of FIG. 20. FIG. 23A depicts a first computer device 2302 that has access to first data set shares S1 2304, a second computer device 2306 that has access to second data set shares S2 2308, and a third computer device 2310 that has access to third data set shares S3 2312. In FIG. 23B, when the first computer device 2302 enters a wireless connection range 2314 of the second computer device 2306 and connects to the second computer device 2306 via a wireless connection, the first computer device 2302 receives the second data set shares S2 2308 from the second computer device 2306. In FIG. 23C, when the first computer device 2302 enters a wireless connection range 2316 of the third computer device 2310 and connects to the third computer device 2310 via a wireless connection, the first computer device 2302 receives the third data set shares S3 2312 from the third computer device 2310.

Figure 24A:
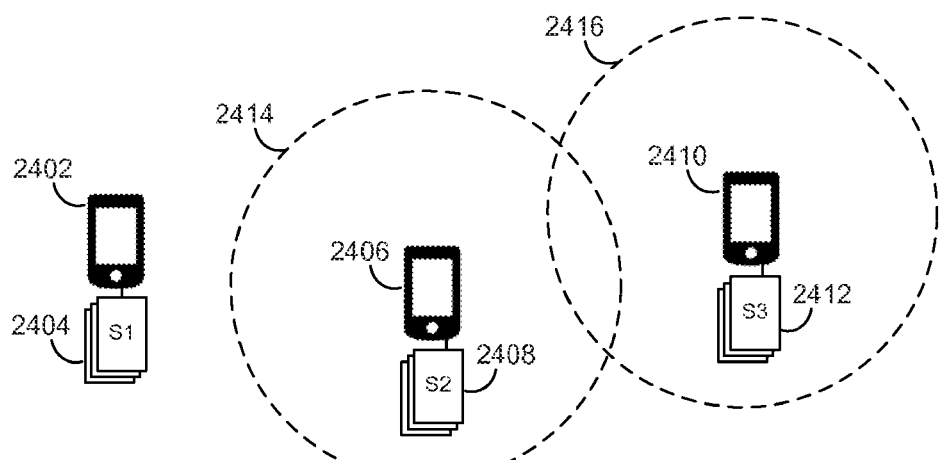
FIGS. 24A and 24B illustrate another implementation of some of the steps of FIG. 20.
Figure 24B:
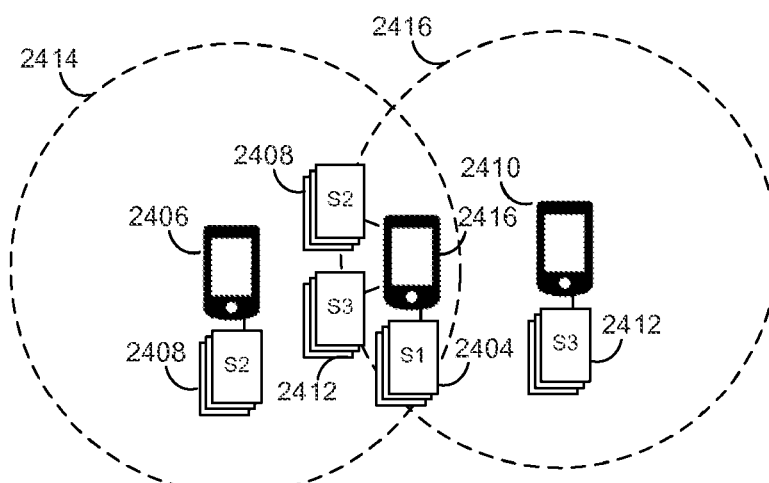

FIGS. 24A and 24B illustrate another implementation of several of the steps of FIG. 20. FIG. 24A depicts a first computer device 2402 that has access to first data set shares S1 2404, a second computer device 2406 that has access to second data set shares S2 2408, and a third computer device 2410 that has access to third data set shares S3 2412. In FIG. 24B, when the first computer device 2402 is in a wireless connection range 2414 of the second computer device 2406 and connects to the second computer device 2406 via a wireless connection, and also is in a wireless connection range 2416 of the third computer device 2410 and connects to the third computer device 2410 via a wireless connection, the first computer device 2402 receives the second data set shares S2 2408 from the second computer device 2406 and the third data set shares S3 2412 from the third computer device 2410.

Figure 25A:
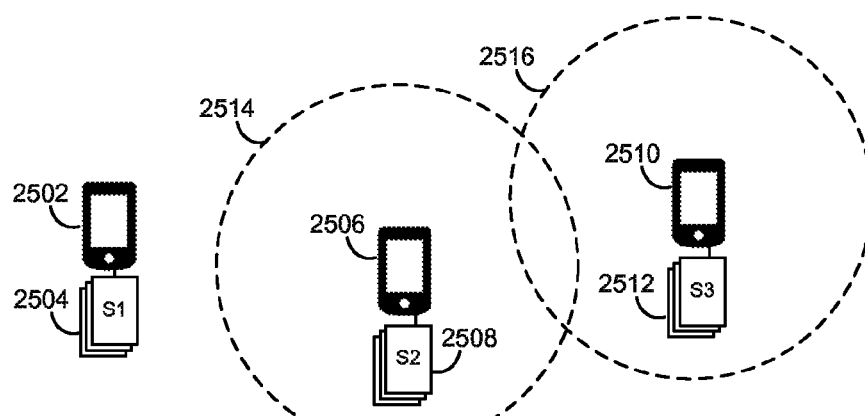
FIGS. 25A-25C illustrate another implementation of some of the steps of FIG. 20.
Figure 25B:
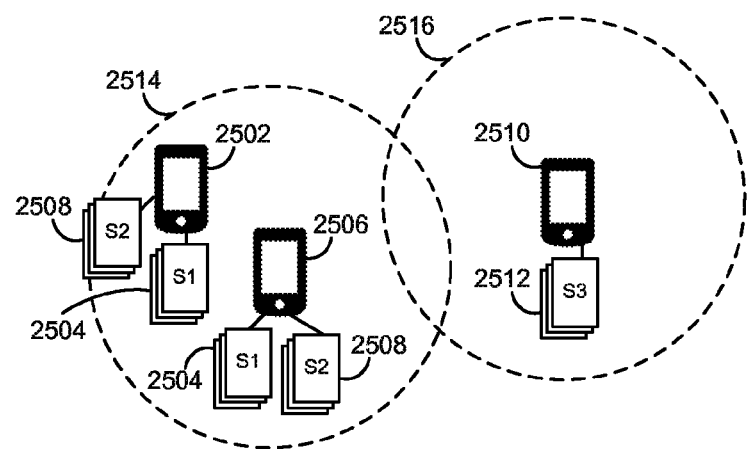
Figure 25C:
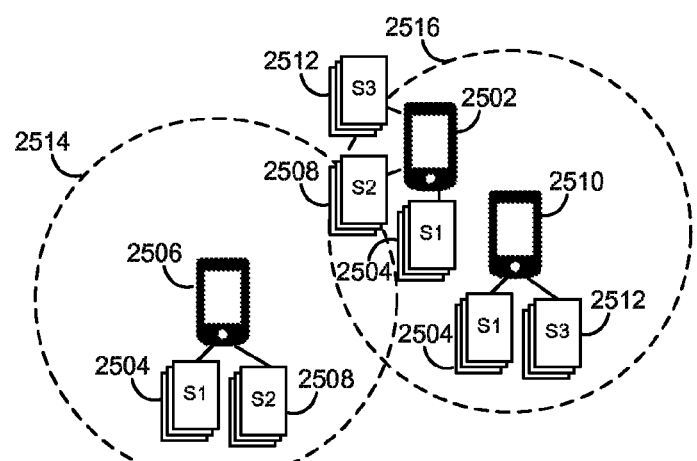

FIGS. 25A-25C illustrate another implementation of several of the steps of FIG. 20. FIG. 25A depicts a first computer device 2502 that has access to first data set shares S1 2504, a second computer device 2506 that has access to second data set shares S2 2508, and a third computer device 2510 that has access to third data set shares S3 2512. In FIG. 25B, when the first computer device 2502 enters a wireless connection range 2514 of the second computer device 2506 and connects to the second computer device 2506 via a wireless connection, the first computer device 2502 receives the second data set shares S2 2508 from the second computer device 2506, and also transmits the first data set shares S1 2504 to the second computer device 2506. In FIG. 25C, when the first computer device 2502 enters a wireless connection range 2516 of the third computer device 2510 and connects to the third computer device 2510 via a wireless connection, the first computer device 2502 receives the third data set shares S3 2512 from the third computer device 2510, and also transmits the first data set shares S1 2504 to the third computer device 2510. In some implementations, the first computer device 2502 may transmit both the first data set shares S1 2504 and the second data set shares S2 2508 to the third computer device 2510.

Figure 26A:
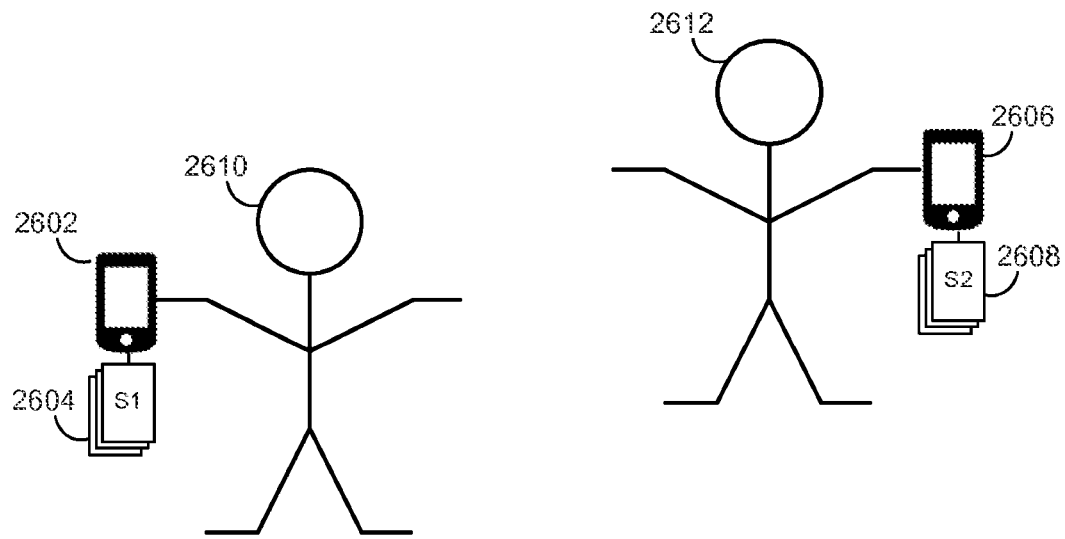
FIGS. 26A and 26B illustrate another implementation of some of the steps of FIG. 20.
Figure 26B:
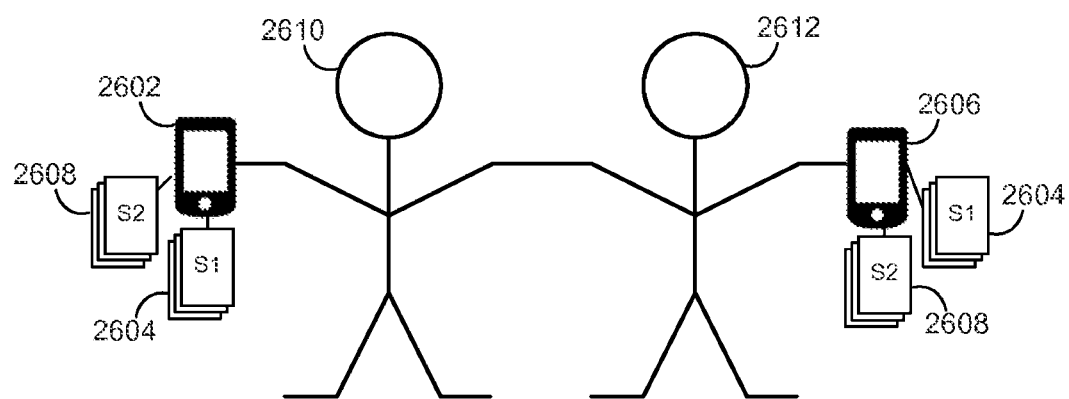

FIGS. 26A and 26B illustrate another implementation of some of the steps of FIG. 20. FIG. 26A depicts a first computer device 2602, held by a first user 2610, that has access to first data set shares S1 2604 and a second computer device 2606, held by a second user 2612, that has access to second data set shares S2 2608. In FIG. 26B, when the first user 2610 comes in physical contact with the second user 2612, the first and second computer devices 2602 and 2606 may detect a relatively low impedance between electrodes mounted on their respective surfaces, and in response, transfer their respective data set shares to the other device.

Other combinations, additions, substitutions and modifications will be apparent to the skilled artisan in view of the disclosure herein.

What is claimed is:

1. A method for securing a virtual machine, comprising:
   executing a virtual machine on a host device, the virtual machine comprising virtual machine files;
   generating data parsing information, wherein the data parsing information is usable to (1) specify a substantially random technique for determining into which of a plurality of shares a portion of the virtual machine files will be placed and (2) select from two or more data encryption techniques a data encryption technique to be used to encrypt the portion; and
   in response to receiving a command to stop the virtual machine:
   generating the plurality of shares based on the data parsing information; and
   causing each of the plurality of shares to be stored in respective separate storage locations, wherein the respective separate storage locations include one or more directories located on the host device, the one or more directories designated to store files associated with a non-virtual machine application;
   wherein the virtual machine files are restorable by accessing a threshold number of the plurality of shares.

2. The method of claim 1, wherein the host device is a handheld computing device.

3. The method of claim 1, wherein the virtual machine files comprise at least one of a log file, a virtual machine BIOS status file, a virtual disk file, a paging file, a snapshot state file, a suspended state file, and a configuration file.

4. The method of claim 1, wherein the command to stop the virtual machine comprises at least one of a save command, a shut down command, a suspend command, and a pause command.

5. The method of claim 1, wherein the command to stop the virtual machine is issued by a user of the host device.

6. The method of claim 1, wherein the command to stop the virtual machine is issued by a processor of the host device without a substantially contemporaneous command from a user of the host device.

7. The method of claim 1, wherein generating the plurality of shares based on the data parsing information comprises:
identifying a plurality of portions of the virtual machine files; and
encrypting each of the plurality of portions to form the plurality of shares.

8. The method of claim 1, wherein generating the plurality of shares based on the data parsing information comprises:
encrypting the virtual machine files; and
identifying a plurality of portions of the encrypted virtual machine files to form the plurality of shares.

9. The method of claim 1, wherein the data parsing information specifies a substantially random technique for determining into which position within each of the plurality of shares the portion of the virtual machine files will be placed.

10. The method of claim 1, wherein the separate storage locations include a plurality of separate storage locations on the host device.

11. The method of claim 1, wherein the separate storage locations include a plurality of separate storage locations on one or more devices remote from the host device.

12. The method of claim 1, wherein the separate storage locations include at least one storage location on the host device and at least one storage location on a device remote from the host device.

13. The method of claim 1, further comprising:
prior to executing the virtual machine on the host device:
receiving a second plurality of shares; and
restoring the virtual machine files from the second plurality of shares using data restoring information that determines how to decrypt and arrange portions from the plurality of shares to form the virtual machine files.

14. The method of claim 13, wherein the second plurality of shares is received from one or more devices remote from the host device.

15. The method of claim 14, wherein the one or more devices remote from the host device include one or more data servers.

16. The method of claim 14, wherein the separate storage locations in which the plurality of shares are respectively stored are located on the one or more devices remote from the host device from which the second plurality of shares is received.

17. The method of claim 1, further comprising:
prior to generating data parsing information:
receiving a third plurality of shares; and
restoring an executable parsing application from the third plurality of shares;
wherein the data parsing information is generated by the executable parsing application.

18. The method of claim 17, wherein the third plurality of shares is received from one or more devices remote from the host device.

19. The method of claim 18, wherein the one or more devices remote from the host device include one or more data servers.

20. The method of claim 17, wherein restoring the executable splitting application from the third plurality of shares comprises assembling the third plurality of shares according to a technique stored in and executable by the host device.

21. The method of claim 17, wherein restoring the executable parsing application from the third plurality of shares comprises assembling the third plurality of shares according to a technique specified in the third plurality of shares and executable by the host device.

22. The method of claim 1, wherein the threshold number is less than a total number of the plurality of shares.

23. The method of claim 1, wherein the data parsing information determines the size of each of the shares, wherein the size of at least one share is different from the size of at least one other share.

24. The method of claim 1, wherein the host device comprises one or more computers in a distributed architecture.

25. The method of claim 1, wherein the host device comprises one or more computers in a cloud computing environment.

26. A computer system for securing a virtual machine, comprising:
processing circuitry in communication with one or more storage locations, the processing circuitry being associated with communications circuitry for receiving communications, the processing circuitry being configured to:
execute a virtual machine on a host device, the virtual machine comprising virtual machine files;
generate data parsing information, wherein the data parsing information is usable to (1) specify a substantially random technique for determining into which of a plurality of shares a portion of the virtual machine files will be placed and (2) select from two or more data encryption techniques a data encryption technique to be used to encrypt the portion; and
in response to receiving a command to stop the virtual machine:
generate the plurality of shares based on the data parsing information; and
cause each of the plurality of shares to be stored in respective separate storage locations, wherein the respective separate storage locations include one or more directories located on the host device, the one or more directories designated to store files associated with a non-virtual machine application;
wherein the virtual machine files are restorable by accessing a threshold number of the plurality of shares.

27. The system of claim 26, wherein the host device is a handheld computing device.

28. The system of claim 26 wherein the virtual machine files comprise at least one of a log file, a virtual machine BIOS status file, a virtual disk file, a paging file, a snapshot state file, a suspended state file, and a configuration file.

29. The system of claim 26, wherein the command to stop the virtual machine comprises at least one of a save command, a shut down command, a suspend command, and a pause command.

30. The system of claim 26, wherein the command to stop the virtual machine is issued by a user of the host device.

31. The system of claim 26, wherein the command to stop the virtual machine is issued by a processor of the host device without a substantially contemporaneous command from a user of the host device.

32. The system of claim 26, wherein generating the plurality of shares based on the data parsing information comprises:
identifying a plurality of portions of the virtual machine files; and
encrypting each of the plurality of portions to form the plurality of shares.

33. The system of claim 26, wherein generating the plurality of shares based on the data parsing information comprises:
encrypting the virtual machine files; and
identifying a plurality of portions of the encrypted virtual machine files to form the plurality of shares.

34. The system of claim 26, wherein the data parsing information specifies a substantially random technique for determining into which position within each of the plurality of shares the portion of the virtual machine files will be placed.

35. The system of claim 26, wherein the separate storage locations include a plurality of separate storage locations on the host device.

36. The system of claim 26, wherein the separate storage locations include a plurality of separate storage locations on one or more devices remote from the host device.

37. The system of claim 26, wherein the separate storage locations include at least one storage location on the host device and at least one storage location on a device remote from the host device.

38. The system of claim 26, wherein the processing circuitry is further configured to:
prior to executing the virtual machine on the host device:
receive a second plurality of shares; and
restore the virtual machine files from the second plurality of shares using data restoring information that determines how to decrypt and arrange portion from the plurality of shares to form the virtual machine files.

39. The system of claim 38, wherein the second plurality of shares is received from one or more devices remote from the host device.

40. The system of claim 39, wherein the one or more devices remote from the host device include one or more data servers.

41. The system of claim 39, wherein the separate storage locations in which the plurality of shares are respectively stored are located on the one or more devices remote from the host device from which the second plurality of shares is received.

42. The system of claim 26, wherein the processing circuitry is configured to:
prior to generating data parsing information:
receive a third plurality of shares; and
restore an executable parsing application from the third plurality of shares;
wherein the data parsing information is generated by the executable parsing application.

43. The system of claim 42, wherein the third plurality of shares is received from one or more devices remote from the host device.

44. The system of claim 43, wherein the one or more devices remote from the host device include one or more data servers.

45. The system of claim 42, wherein restoring the executable parsing application from the third plurality of shares comprises assembling the third plurality of shares according to a technique stored in and executable by the host device.

46. The system of claim 42, wherein restoring the executable parsing application from the third plurality of shares comprises assembling the third plurality of shares according to a technique specified in the third plurality of shares and executable by the host device.

47. The system of claim 26, wherein the threshold number is less than a total number of the plurality of shares.

48. The system of claim 26, wherein the data parsing information determines the size of each of the shares, wherein the size of at least one share is different from the size of at least one other share.

49. The system of claim 26, wherein the processing circuitry comprises one or more computers in a distributed architecture.

50. The system of claim 26, wherein the processing circuitry comprises one or more computers in a cloud computing environment.

51. The method of claim 1, wherein the one or more directories include a subdirectory contained within a directory designated to store files associated with the non-virtual machine application.

52. A method for securing a virtual machine, comprising:
executing a virtual machine on a host device, the virtual machine comprising virtual machine files;
generating data parsing information, wherein the data parsing information is usable to specify a substantially random technique for determining into which of a plurality of shares a portion of the virtual machine files will be placed and how the portion will be encrypted; and
in response to receiving a command to stop the virtual machine:
generating the plurality of shares based on the data parsing information; and
causing each of the plurality of shares to be stored in respective separate storage locations, wherein the respective separate storage locations include one or more directories located on the host device, the one or more directories designated to store files associated with a non-virtual machine application, wherein the one or more directories being designated to store files associated with the non-virtual machine application is named based on a name of the non-virtual machine application;
wherein the virtual machine files are restorable by accessing a threshold number of the plurality of shares.

53. The system of claim 26, wherein the one or more directories include a subdirectory contained within a directory designated to store files associated with the non-virtual machine application.

54. A computer system for securing a virtual machine, comprising:
processing circuitry in communication with one or more storage locations, the processing circuitry being associated with communications circuitry for receiving communications, the processing circuitry being configured to:
execute a virtual machine on a host device, the virtual machine comprising virtual machine files;
generate data parsing information, wherein the data parsing information is usable to specify a substantially random technique for determining into which of a plurality of shares a portion of the virtual machine files will be placed and how the portion will be encrypted; and in response to receiving a command to stop the virtual machine:
  generate the plurality of shares based on the data parsing information; and
  cause each of the plurality of shares to be stored in respective separate storage locations, wherein the respective separate storage locations include one or more directories located on the host device, the one or more directories designated to store files associated with a non-virtual machine application, wherein the one or more directories being designated to store files associated with the non-virtual machine application is named based on a name of the non-virtual machine application;
wherein the virtual machine files are restorable by accessing a threshold number of the plurality of shares.

* * * * *